(12) United States Patent
Morais et al.

(10) Patent No.: US 7,650,495 B2
(45) Date of Patent: Jan. 19, 2010

(54) SECURITY GATEWAY FOR ONLINE CONSOLE-BASED GAMING

(75) Inventors: Dinarte R. Morais, Redmond, WA (US); Mark D. VanAntwerp, Redmond, WA (US); Boyd C. Multerer, Seattle, WA (US); Daniel Caiafa, Redmond, WA (US); Ling T. Chen, Bellevue, WA (US); Michael Courage, Kirkland, WA (US); Damon V. Danieli, Bellevue, WA (US); Eric Neustadter, Sammamish, WA (US); Sean Christian Wohlgemuth, Marysville, WA (US)

(73) Assignee: Microsoft Corporation, Redmond, WA (US)

( * ) Notice: Subject to any disclaimer, the term of this patent is extended or adjusted under 35 U.S.C. 154(b) by 163 days.

(21) Appl. No.: 12/053,857

(22) Filed: Mar. 24, 2008

(65) Prior Publication Data
US 2008/0177997 A1  Jul. 24, 2008

Related U.S. Application Data

(63) Continuation of application No. 10/170,003, filed on Jun. 10, 2002, now Pat. No. 7,370,194.

(51) Int. Cl.
*H04L 29/06* (2006.01)
*G06F 9/00* (2006.01)

(52) U.S. Cl. .................. 713/155; 713/156; 726/10; 726/12

(58) Field of Classification Search .................. 713/155, 713/156; 726/10, 12
See application file for complete search history.

(56) References Cited

U.S. PATENT DOCUMENTS

| 4,200,770 A | 4/1980 | Hellman et al. |
| 4,652,998 A | 3/1987 | Koza et al. |

(Continued)

FOREIGN PATENT DOCUMENTS

WO  WO0242921 A1  5/2002

OTHER PUBLICATIONS

Achemlal et al., "Analysis of IPSEC Services and their Integration in an IP Virtual Private Network", Annales Des Telecommunications-Annals of Telecommunications, 2000, V 55, N7-8 (Jul.-Aug.), pp. 313-323.

(Continued)

*Primary Examiner*—Nasser G Moazzami
*Assistant Examiner*—Mohammad W Reza
(74) *Attorney, Agent, or Firm*—Lee & Hayes, PLLC

(57) ABSTRACT

An exemplary implementation of a security gateway for online console-based gaming operates as a gateway between a public network (e.g., the Internet), and a private network (e.g., an internal data center network). The security gateway allows secure communication channels to be established with game consoles via the public network, and allows secure communication between game consoles on the public network and service devices on the private network.

15 Claims, 9 Drawing Sheets

U.S. PATENT DOCUMENTS

| | | | |
|---|---|---|---|
| 5,535,276 | A | 7/1996 | Ganesan |
| 5,586,257 | A | 12/1996 | Perlman |
| 5,592,651 | A | 1/1997 | Rackman |
| 5,643,086 | A | 7/1997 | Alcorn et al. |
| 5,685,775 | A | 11/1997 | Bakoglu et al. |
| 5,745,574 | A | 4/1998 | Muftic |
| 5,764,887 | A | 6/1998 | Kells et al. |
| 5,778,065 | A | 7/1998 | Hauser et al. |
| 5,898,784 | A | 4/1999 | Kirby et al. |
| 5,984,787 | A | 11/1999 | Redpath |
| 6,006,266 | A | 12/1999 | Murphy, Jr. et al. |
| 6,012,096 | A | 1/2000 | Link et al. |
| 6,026,079 | A | 2/2000 | Perlman |
| 6,099,408 | A | 8/2000 | Schneier et al. |
| 6,134,590 | A | 10/2000 | Perlman |
| 6,152,824 | A | 11/2000 | Rothschild et al. |
| 6,246,666 | B1 | 6/2001 | Purcell et al. |
| 6,327,662 | B1 | 12/2001 | Araujo |
| 6,330,562 | B1 | 12/2001 | Boden et al. |
| 6,468,160 | B2 | 10/2002 | Eliott |
| 6,527,638 | B1 | 3/2003 | Walker et al. |
| 6,712,704 | B2 | 3/2004 | Eliott |
| 6,769,989 | B2 | 8/2004 | Smith et al. |
| 6,795,917 | B1 | 9/2004 | Ylonen |
| 6,915,437 | B2 | 7/2005 | Swander et al. |
| 7,024,692 | B1 | 4/2006 | Schanze et al. |
| 2001/0004609 | A1 | 6/2001 | Walker et al. |
| 2001/0036181 | A1 | 11/2001 | Rogers |
| 2002/0019933 | A1 | 2/2002 | Friedman et al. |
| 2002/0046348 | A1 | 4/2002 | Brustoloni |
| 2002/0071557 | A1 | 6/2002 | Nguyen |
| 2002/0091921 | A1 | 7/2002 | Kunzinger |
| 2002/0104019 | A1 | 8/2002 | Chatani et al. |
| 2002/0146132 | A1 | 10/2002 | Medvinsky |
| 2002/0152377 | A1 | 10/2002 | Bauman et al. |
| 2004/0162137 | A1 | 8/2004 | Eliott |

OTHER PUBLICATIONS

Baughman et al., "Cheat-Proof Playout for Centralized and Distributed Online Games", Proceedings IEEE INFOCOM 2001, Conference on Computer Communications, Twentieth Annual Joint Conference of the IEEE Computer and Communications Society, vol. 1, Apr. 22-26, 2001, pp. 104-113.

Canetti, "Universally Composable Security: A New Paradigm for Cryptographic Protocols", Proceedings 42nd IEEE Symposium on Foundations of Computer Science, Oct. 14-17, 2001, pp. 136-145.

Chung et al., "Design & Analysis of Smart Card Based Remote Authentication Protocol for Internet-based System," Proceedings 10th IEEE Int, Workshop on Enabling Technologies: Infrastructure for Collaborative Enterprises, Jun. 20-22, 2001, p. 229-230.

Cox, "Online and Multiplayer Gaming- An Overview", Virtual Reality (UK), Computer Games and Interactive Entertainment, Oct. 25, 2000, vol. 5, No. 4, pp. 215-222.

Day, "Online Games: Crafting Persistent-State Worlds", IEEE Compt. Soc., Oct. 2001, vol. 34, No. 10, pp. 111-112.

Diffie, et al., "New Directions in Cryptography", IEEE Transactions on Information Theory, Vo. IT-22, No. 6, Nov. 1976, pp. 644-654.

Kaufman, et al., "PDM: A New Strong Password-Based Protocol," Proceedings of the 10th USENIX Security Symposium, Aug. 13-17, 2001, pp. 313-321.

Kohl, et al., "The Kerberos Network Authentication Service (V5)" IETF Network Working Group, Sep. 1993, pp. 1-110.

Krawczyk, et al., Network Working Group Request for Comments: 2104, Category: Informational, "HMAC: Keyed-Hashing for Message Authentication," Feb. 1997, pp. 1-11.

"Microsoft Boosts Accessibility to Internet Gaming Zone with Latest Release", Microsoft PressPass, Apr. 27, 1998, 2 pgs.

"Microsoft Unveils a More User-Friendly MSN Gaming Zone", Microsoft PressPass, Aug. 31, 1999, 2 pgs.

Phillips, et al., "On-Line Load Balancing and Network Flow", Algorithmica, Jul. 1998, vol. 21, No. 3, pp. 245-261.

Solms, et al., "Information Security: Mutual Authentication in E-Commerce," Advances in Network and Distibuted Systems Security, IFIP TC1 WG11.4, First Annul Working Conference on Network Security, Nov. 26-27, 2001, pp. 15-31.

Stallings, "Cryptography and Network Security Principles and Practice", 2nd Edition, 1999, pp. 337-338.

SECURITY GATEWAY FOR ONLINE CONSOLE-BASED GAMING

RELATED APPLICATIONS

This US application is a continuation of U.S. application Ser. No. 10/170,003, filed Jun. 10, 2002, which is incorporated herein by reference.

TECHNICAL FIELD

This invention relates to game consoles and online gaming, and particularly to a security gateway for online console-based gaming.

BACKGROUND

Traditionally, gaming systems with a dedicated console were standalone machines that accommodated a limited number of players (e.g., 2-4 players). Personal computer-based gaming grew in popularity in part due to the ability to play games online with many remote players over the Internet. Thus, one trend for dedicated gaming systems is to provide capabilities to facilitate gaming over a network, such as Internet-based online gaming.

Online gaming can be implemented in a centralized-server approach or a peer-to-peer approach. In the centralized-server approach, gaming systems connect to one or more centralized-servers and interact with one another via this centralized-server(s). In the peer-to-peer approach, gaming systems connect to one another and interact with one another directly. However, even in the peer-to-peer approach, a centralized server(s) may be employed to assist in the communication, such as an initial match-making service to help gaming systems find one another.

One problem encountered in employing such a centralized server(s) is to protect network traffic between the server(s) and the gaming systems from tampering or observation by other devices on the network. Gamers are notorious for developing creative cheating mechanisms, making the network traffic a ripe target for such users. Unfortunately, previous console-based gaming systems typically did not provide for secure communications with a centralized server(s).

The security gateway for online console-based gaming described below solves these and other problems.

SUMMARY

Security gateway for online console-based gaming is described herein.

According to one aspect, a security gateway operates as a gateway between a public network (e.g., the Internet), and a private network (e.g., an internal data center network). The security gateway allows secure communication channels to be established with game consoles via the public network, and allows secure communication between game consoles on the public network and service devices on the private network.

BRIEF DESCRIPTION OF THE DRAWINGS

The same numbers are used throughout the document to reference like components and/or features.

DETAILED DESCRIPTION

The following discussion is directed to a security gateway for online services for console-based gaming systems. The discussion assumes that the reader is familiar with basic cryptography principles, such as encryption, decryption, authentication, hashing, and digital signatures. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Figure 1:
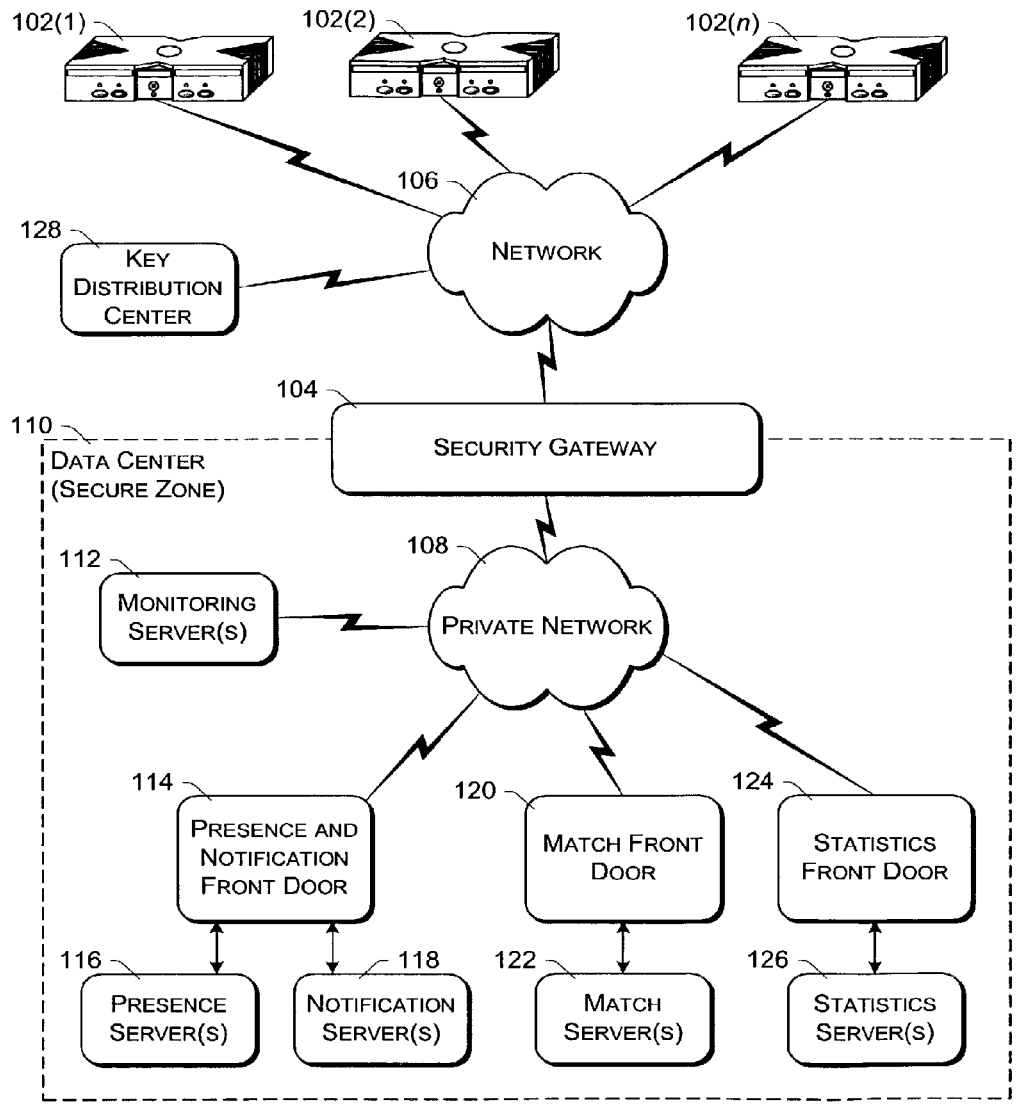
FIG. 1 is a block diagram of an exemplary online gaming environment.

FIG. 1 is a block diagram of an exemplary online gaming environment 100. Multiple game consoles 102(1), 102(2), ..., 102(n) are coupled to a security gateway 104 via a network 106. Network 106 represents any one or more of a variety of conventional data communications networks. Network 106 will typically include packet switched networks, but may also include circuit switched networks. Network 106 can include wire and/or wireless portions. In one exemplary implementation, network 106 includes the Internet and may optionally include one or more local area networks (LANs) and/or wide area networks (WANs). At least a part of network 106 is a public network, which refers to a network that is publicly-accessible. Virtually anyone can access the public network.

In some situations, network 106 includes a LAN (e.g., a home network), with a routing device situated between game console 102 and security gateway 104. This routing device may perform network address translation (NAT), allowing the multiple devices on private network 108 (or a LAN) to share the same IP address on the Internet, and also operating as a firewall to protect the device(s) from access by malicious or mischievous users via the Internet.

Security gateway 104 operates as a gateway between public network 106 and private network 108. Private network 108 can be any of a wide variety of conventional networks, such as a local area network. Private network 108, as well as other devices discussed in more detail below, is within a data center 110 that operates as a secure zone. Data center 110 is made up of trusted devices communicating via trusted communications. Thus, encryption and authentication within secure zone 110 is not necessary. The private nature of network 108 refers to the restricted accessibility of network 108—access to network 108 is restricted to only certain individuals (e.g., restricted by the owner or operator of data center 110).

Security gateway 104 is a cluster of one or more security gateway computing devices. These security gateway computing devices collectively implement security gateway 104. Security gateway 104 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 110 are: one or more monitoring servers 112; one or more presence and notification front doors 114, one or more presence servers 116, and one or more notification servers 118 (collectively implementing a presence and notification service); one or more match front doors 120 and one or more match servers 122 (collectively implementing a match service); and one or more statistics front doors 124 and one or more statistics servers 126 (collectively implementing a statistics service). The servers 116, 118, 122, and 126 provide services to game consoles 102, and thus can be referred to as service devices. Other service devices may also be included in addition to, and/or in place of, one or more of the servers 116, 118, 122, and 126. Additionally, although only one data center is shown in FIG. 1, alternatively multiple data centers may exist with which game consoles 102 can communicate. These data centers may operate independently or alternatively may operate collectively (e.g., to make one large data center available to game consoles 102).

Game consoles 102 are situated remotely from data center 110, and access data center 110 via network 106. A game console 102 desiring to communicate with one or more devices in the data center establishes a secure communication channel between the console 102 and security gateway 104. Game console 102 and security gateway 104 encrypt and authenticate data packets being passed back and forth, thereby allowing the data packets to be securely transmitted between them without being understood by any other device that may capture or copy the data packets without breaking the encryption. Each data packet communicated from game console 102 to security gateway 104, or from security gateway 104 to game console 102 can have data embedded therein. This embedded data is referred to as the content or data content of the packet. Additional information may also be inherently included in the packet based on the packet type (e.g., a heartbeat packet or traversal packet, discussed in more detail below).

The secure communication channel between a console 102 and security gateway 104 is based on a security ticket. Console 102 authenticates itself and the current user(s) of console 102 to a key distribution center 128 and obtains, from key distribution center 128, a security ticket. Console 102 then uses this security ticket to establish the secure communication channel with security gateway 104. In establishing the secure communication channel with security gateway 104, the game console 102 and security gateway 104 authenticate themselves to one another and establish a session security key that is known only to that particular game console 102 and the security gateway 104. This session security key is used as a basis to encrypt data transferred between the game console 102 and the security gateway cluster 104, so no other devices (including other game consoles 102) can read the data. The session security key is also used as a basis to authenticate a data packet as being from the security gateway 104 or game console 102 that the data packet alleges to be from. Thus, using such session security keys as a basis, secure communication channels can be established between the security gateway 104 and the various game consoles 102.

Once the secure communication channel is established between a game console 102 and the security gateway 104, encrypted data packets can be securely transmitted between the two. When the game console 102 desires to send data to a particular service device in data center 110, the game console 102 encrypts the data and sends it to security gateway 104 requesting that it be forwarded to the particular service device(s) targeted by the data packet. Security gateway 104 receives the data packet and, after authenticating and decrypting the data packet, encapsulates the data content of the packet into another message to be sent to the appropriate service via private network 108. Security gateway 104 determines the appropriate service for the message based on the requested service(s) targeted by the data packet.

Similarly, when a service device in data center 110 desires to communicate data to a game console 102, the data center sends a message to security gateway 104, via private network 108, including the data content to be sent to the game console 102 as well as an indication of the particular game console 102 to which the data content is to be sent. Security gateway 104 embeds the data content into a data packet, and then encrypts the data packet so it can only be decrypted by the particular game console 102 and also authenticates the data packet as being from the security gateway 104.

Although discussed herein as primarily communicating encrypted data packets between security gateway 104 and a game console 102, alternatively some data packets may be partially encrypted (some portions of the data packets are encrypted while other portions are not encrypted). Which portions of the data packets are encrypted and which are not can vary based on the desires of the designers of data center 110 and/or game consoles 102. For example, the designers may choose to allow voice data to be communicated among consoles 102 so that users of the consoles 102 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, the data packet is still authenticated.

Each security gateway device in security gateway 104 is responsible for the secure communication channel with typically one or more game consoles 102, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 112 operate to inform devices in data center 110 of an unavailable game console 102 or an unavailable security gateway device of security gateway 104. Game consoles 102 can become unavailable for a variety of different reasons, such as a hardware or software failure, the console being powered-down without logging out of data center 110, the network connection cable to console 102 being disconnected from console 102, other network problems (e.g., the LAN that the console 102 is on malfunctioning), etc. Similarly, a security gateway device of security gateway 104 can become unavailable for a variety of different reasons, such as hardware or software failure, the device being powered-down, the network connection cable to the device being disconnected from the device, other network problems, etc.

Each of the security gateway devices in security gateway 104 is monitored by one or more monitoring servers 112, which detect when one of the security gateway devices becomes unavailable. In the event a security gateway device becomes unavailable, monitoring server 112 sends a message to each of the other devices in data center 110 (servers, front doors, etc.) that the security gateway device is no longer available. Each of the other devices can operate based on this it information as it sees fit (e.g., it may assume that particular game consoles being managed by the security gateway device are no longer in communication with data center 110 and perform various clean-up operations accordingly). Alternatively, only certain devices may receive such a message from the monitoring server 112 (e.g., only those devices that are concerned with whether security gateway devices are available).

Security gateway 104 monitors the individual game consoles 102 and detects when one of the game consoles 102 becomes unavailable. When security gateway 104 detects that a game console is no longer available, security gateway 104 sends a message to monitoring server 112 identifying the unavailable game console. In response, monitoring server 112 sends a message to each of the other devices in data center 110 (or alternatively only selected devices) that the game console is no longer available. Each of the other devices can then operate based on this information as it sees fit.

Presence server(s) 116 holds and processes data concerning the status or presence of a given user logged in to data center 110 for online gaming. Notification server(s) 118 maintains multiple queues of outgoing messages destined for a player logged in to data center 110. Presence and notification front door 114 is one or more server devices that operate as an intermediary between security gateway 104 and servers 116 and 118. One or more load balancing devices (not shown) may be included in presence and notification front door 114 to balance the load among the multiple server devices operating as front door 114. Security gateway 104 communicates messages for servers 116 and 118 to the front door 114, and the front door 114 identifies which particular server 116 or particular server 118 the message is to be communicated to. By using front door 114, the actual implementation of servers 116 and 118, such as which servers are responsible for managing data regarding which users, is abstracted from security gateway 104. Security gateway 104 can simply forward messages that target the presence and notification service to presence and notification front door 114 and rely on front door 114 to route the messages to the appropriate one of server(s) 116 and server(s) 118.

Match server(s) 122 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 120 includes one or more server devices (and optionally a load balancing device(s)) and operates to abstract match server(s) 122 from security gateway 104 in a manner analogous to front door 114 abstracting server(s) 116 and server(s) 118.

Statistics server(s) 126 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 126 includes one or more server devices (and optionally a load balancing device(s)) and operates to abstract statistics server(s) 126 from security gateway 104 in a manner analogous to front door 114 abstracting server(s) 116 and server(s) 118.

Thus, it can be seen that security gateway 104 operates to shield devices in the secure zone of data center 110 from the untrusted, public network 106. Communications within the secure zone of data center 110 need not be encrypted, as all devices within data center 110 are trusted. However, any information to be communicated from a device within data center 110 to a game console 102 passes through security gateway cluster 104, where it is encrypted in such a manner that it can be decrypted by only the game console 102 targeted by the information.

Figure 2:
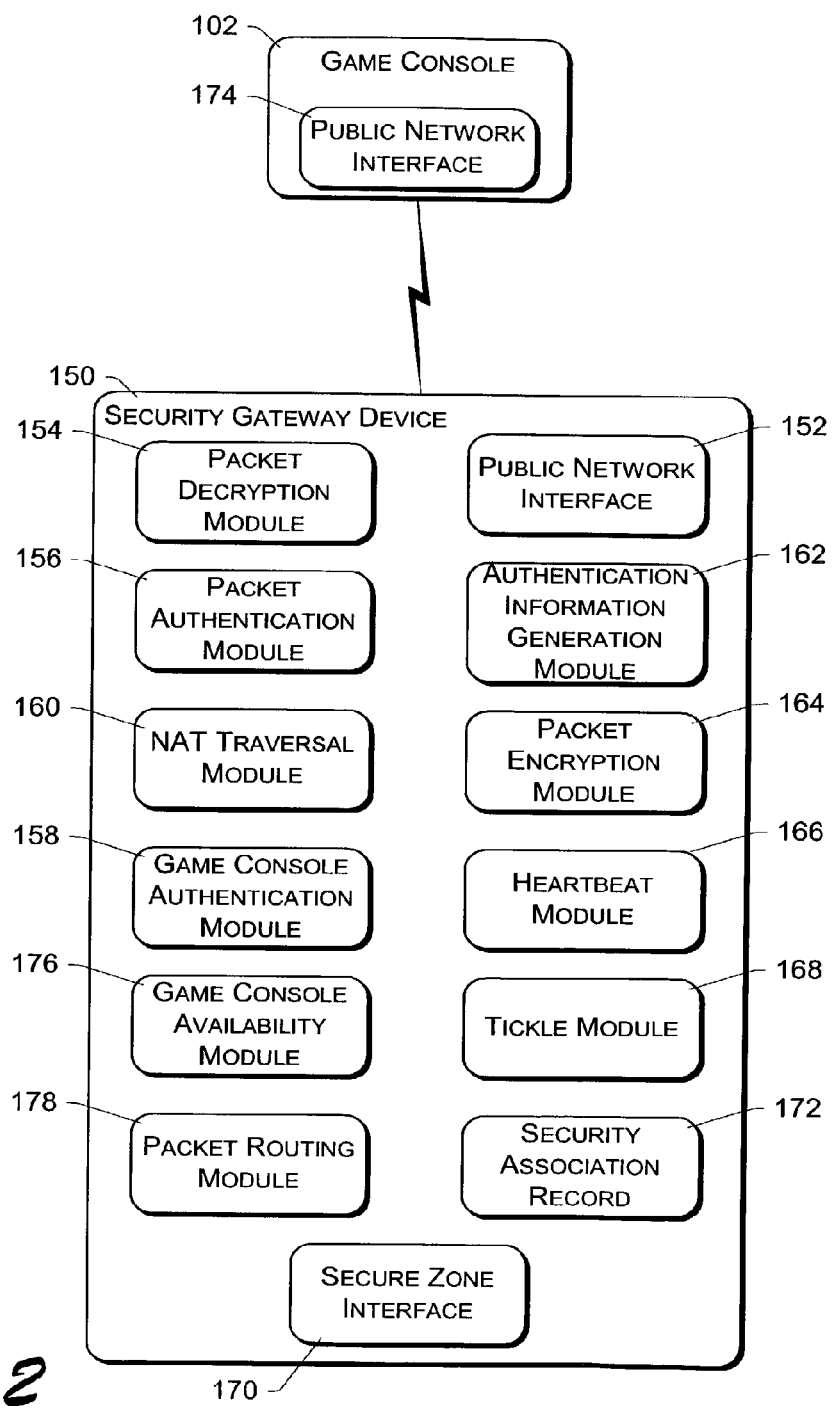
FIG. 2 is a block diagram illustrating an exemplary security gateway device in additional detail.

FIG. 2 is a block diagram illustrating an exemplary security gateway device 150 in additional detail. Multiple such security gateway devices 150 can be included in security gateway 104. Security gateway device 150 includes a public network interface 152, a packet decryption module 154, a packet authentication module 156, a game console authentication module 158, a network address translation (NAT) traversal module 160, an authentication information generation module 162, a packet encryption module 164, a heartbeat module 166, a tickle module 168, a secure zone interface 170, a security association record 172, a game console availability module 176, and a packet routing module 178. Reference is made herein to modules of security gateway device 150 communicating data to one another, or making data available to one another. This communication or availability can be implemented in a wide variety of different manners, such as passing a data structure including the data from one module to another, passing a pointer (e.g., to a memory location) where the data is stored from one module to another, etc.

Public network interface 152 operates as an interface to communicate, via a public network (e.g., network 106 of FIG. 1), with game console 102. Packet decryption module 154 operates to decrypt data packets received from game console 102, and packet authentication module 156 operates to authenticate packets received from game console 102. Game console authentication module 158 operates to authenticate game console 102. NAT traversal module 160 operates to forward packets from game console 102 to a device in data center 110, or to forward packets from a device in data center 110 to game console 102. Authentication information generation module 162 operates to generate authentication information for packets being sent to game console 102, and packet encryption module 164 operates to encrypt packets being sent to game console 102. Heartbeat module 166 operates to generate heartbeat packets to be sent to game console 102, and tickle module 168 operates to manage data to be included in (piggybacked on) on the heartbeat packets being sent to game console 102. Secure zone interface 170 operates as an interface to communicate, via a private network (e.g., network 108 of FIG. 1), with other devices in the data center. Security association record 172 is a record of security information related to the secure communication channels from security gateway device 150 to the various game consoles 102. Game console availability module 176 detects when a game console 102 becomes unavailable, and packet routing module 178 detects different types of packets and routes them accordingly.

The operation of security gateway device 150 is discussed in more detail below with reference to FIGS. 3-6.

Figure 3:
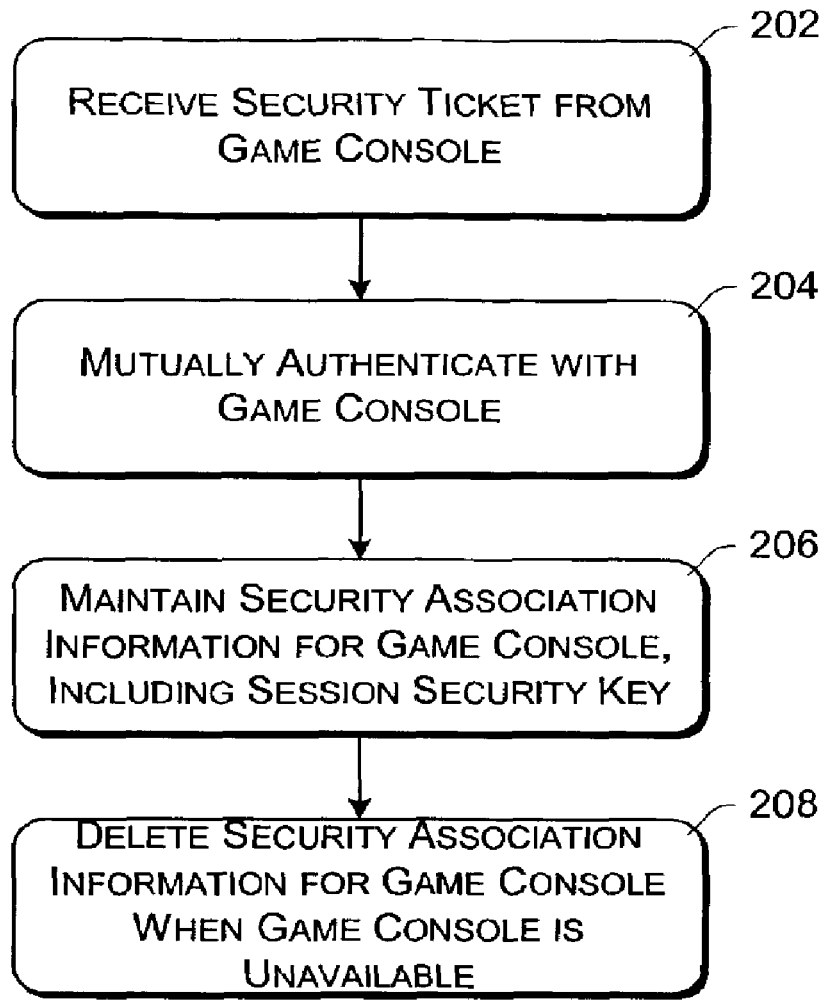
FIG. 3 is a flowchart illustrating an exemplary process for establishing a secure communication channel between a game console and a security gateway device.

FIG. 3 is a flowchart illustrating an exemplary process 200 for establishing a secure communication channel between a game console and a security gateway device. The process of FIG. 3 is implemented by a security gateway device (e.g., device 150 of FIG. 2) and may be performed in software, firmware, hardware, or combinations thereof. The process of FIG. 3 is discussed with reference to components of FIGS. 1 and 2.

Initially, a security ticket is received at the security gateway device (act 202). In one exemplary implementation, the security ticket is a Kerberos ticket obtained from key distribution center 128 of FIG. 1. The Kerberos ticket is obtained by game console 102 using a Kerberos-like authentication protocol that authenticates, in a single ticket, the identities of the particular game console 102 and the one or more user identities playing at the game console 102. The game console 102 obtains the Kerberos ticket as follows.

For discussion purposes, suppose there are four users of the game console 102. Each user is given an identity $U_1$, $U_2$, $U_3$, and $U_4$ and is assigned a user key $K_1$, $K_2$, $K_3$, and $K_4$. The game console 102 is also assigned its own identity C and a game console key $K_C$. Additionally, the game title, such as a game disc, is assigned a separate identity G. In a similar manner, security gateway 104 of FIG. 1 is assigned its own identity A and a key $K_A$. It should be noted that the authentication of users, game consoles, and the security gateway is dependent in part on the keys $K_1$, $K_2$, $K_3$, and $K_4$, $K_C$, and key $K_A$. Therefore, care should be taken in selecting and storing these keys so that only the entities that they are assigned to are able to use them.

Game console 102 generates validated user identities based on the user identities $U_1$, $U_2$, $U_3$, and $U_4$ and user keys $K_1$, $K_2$, $K_3$, and $K_4$. More specifically, the validated user identities include the user identities and values derived from the user keys. The validated user identities will be submitted with a request to the key distribution center and used to demonstrate to the key distribution center that the game console has knowledge of the user key and hence, implicitly authenticates the users.

In order to simplify the description of the way various messages and keys are computed, we will introduce the following notation:

$H = H_{Ky}(M)$: H is a keyed one way hash (MAC) of the message M using the key $K_y$. Any MAC algorithm can be used. One example of such a MAC algorithm is the HMAC algorithm according to IETF RFC 2104.

EncryptedM=$E_{Ky}(M)$: EncryptedM is the encrypted form of message M using the key $K_y$. Any encryption algorithm can be used. Examples of such encryption algorithms include DES, triple DES, and RC4-HMAC.

M=$D_{Ky}$(EncryptedM): M is the original message of EncryptedM before being encrypted using the same key $K_y$.

One way to generate the key derivative value is to compute a cryptographic hash of the user key using the key of the game console. For user $U_1$ with key $K_1$, a hash $H_1$ is computed as follows:

$$H_1 = H_{Kc}(K_1)$$

The hash $H_1$ forms the key derivative value. Another way is to encrypt the current time using the user key $K_1$, as follows:

$$H_1 = E_{K1}(T)$$

Once again, the resulting value $H_1$ forms the key derivative value. The validated user identity is the combination of the user identity $U_1$ and the corresponding key derivative value $H_1$:

$$\text{Validated User Identity} = (U_1, H_1).$$

Game console 102 constructs a request containing the game console identity C, the game title identity G, the online service identity A of the security gateway device 150 (which is the same for all of the security gateway devices in security gateway 104 of FIG. 1), and multiple validated user identities $(U_1, H_1)$, $(U_2, H_2)$, $(U_3, H_3)$, and $(U_4, H_4)$. The request has the following identity string:

$$\text{Request} = [C, G, A, (U_1, H_1), (U_2, H_2), (U_3, H_3), (U_4, H_4)]$$

Additionally, the request may include a version of the authentication protocol and a random nonce generated by the game console to resist replay attacks. The request may further include a checksum value to be used to verify receipt of the entire identity string. Game console 102 submits the request over the network (e.g., network 106 of FIG. 1) to the key distribution center.

The key distribution center evaluates the request as well as the identities contained in the request. The key distribution center generates a random session key to be used for security gateway device 150. In this example, the key distribution center generates a random session key $K_{CA}$ to be used by game console 102 in communicating with the security gateway 104 (in act 202).

The key distribution center generates a ticket that will subsequently be presented by game console 102 to security gateway device 150. There is one ticket issued for security gateway device 150, but the ticket is effective for multiple users. The ticket contains the identity string submitted in the request. It also includes a time $T_G$ that the ticket is generated, a time $T_L$ identifying the time length before expiration of the ticket, the randomly generated session key $K_{CA}$ for security gateway device 150, and a service map $S_m$ identifying the service devices in data center 110 that the users of game console 102 are permitted to access. The key distribution center maintains a record, or access another device or center that maintains a record, of which users are permitted to access which services (e.g., which users have paid a premium to access one or more premium services). The ticket contents are encrypted via a symmetric key cipher (e.g., Triple DES) that utilizes the security gateway device's key $K_A$, as follows:

$$\text{Ticket} = E_{KA}[T_G, T_L, K_{CA}, S_m, C, G, A, U_1, U_2, U_3, U_4]$$

Notice that the ticket does not carry the corresponding key derivative values $H_i$. Once the key distribution center reads the key derivative values and believes the game console knows the user keys, the key distribution center places the identities of the users within the issued tickets. Security gateway device 150 will subsequently believe in whatever the ticket tells it and hence does not need to see the key derivative values $H_1$.

The key distribution center returns the generated ticket to game console 102. Since game console 102 does not know the security gateway device's key $K_A$, game console 102 cannot open the ticket and alter the contents. The key distribution center also returns a session security key in an attached encrypted message. The session key message contains the ticket generation time $T_G$, the ticket expiration length $T_L$, and the session security key $K_{CA}$, and all contents are encrypted using the game console's key $K_C$, as follows:

$$\text{Session Key Message} = E_{Kc}[T_G, T_L, K_{CA}]$$

Since the session key message is encrypted with the game console's key $K_C$, the game console 102 is able to open the session key message and recover the session time parameters and session keys.

Once game console 102 (e.g., a game console) receives the ticket, game console 102 can use the ticket to perform a secure key exchange with mutual authentication with security gateway device 150 (act 204). Additional information regarding the secure key exchange can be found in co-pending U.S. patent application Ser. No. 10/170,002, entitled "Secure Key Exchange with Mutual Authentication", which was filed Jun. 10, 2002 in the names of Dinarte R. Morais, Ling Tony Chen, Damon V. Danieli, and which is hereby incorporated by reference.

The key exchange allows a new secret to be derived by the game console 102 and security gateway device 150 that is shared between console 102 and device 150 but is not transmitted between the two devices and cannot be deduced by a third party (e.g., another device on the same network as console 102 and device 150) based on the roundtrip traffic between console 102 and device 150. In one exemplary implementation, the devices use Diffie-Hellman exponentiation operations to derive the new secret. Additional information regarding Diffie-Hellman can be found in W. Diffie and M. E. Hellman, "New directions in Cryptography", IEEE Transactions on Information Theory v. IT-12, n. 6 Nov. 1976, pp. 644-654.

Generally, the secure key exchange is performed by game console 102 generating a key exchange initiator packet and sending the packet to security gateway device 150. Security gateway device 150 receives the key exchange initiator packet and validates the received packet. Once the packet is validated, security gateway device 150 generates the cryptographic keys to be used to secure communications with game console 102. In an exemplary implementation, these cryptographic keys are security association keys used to secure point-to-point communication between two devices. Security gateway device 150 then generates a key exchange response packet and sends the generated packet to game console 102. Game console 102 receives the key exchange response packet and validates the received packet. Once the packet is validated, game console 102 generates the cryptographic keys to be used to secure communications with security gateway device 150. The cryptographic keys are the same as those generated by security gateway device 150. Thus, both game console 102 and security gateway device 150 end up with the same cryptographic keys, but do so without actually transmitting the keys between them.

Game console 102 generates and sends a key exchange initiator packet by initially generating a key exchange initiator message. The key exchange initiator message includes a random (or pseudo-random) value generated by game console 102 referred to as NonceInit, and also includes the Diffie-Hellman ($g^X$ mod N) value, where X is also a random (or pseudo-random) number generated by game console 102, and a Security Parameters Index value ($SPI_1$) that will be used to uniquely define this console/security device communication channel once the key exchange process is complete, as follows:

$$InitMess = [NonceInit, SPI_1, (g^X \bmod N)].$$

Game console 102 then computes a digest of the key exchange initiator message using the Kerberos session key $K_{CA}$ received from the key distribution center. The digest is generated as follows:

$$HashInitMess = H_{K_{CA}}[InitMess].$$

Alternatively, a generic one way hash (that is not keyed) could also be used is in the computation of HashInitMess. The security of the key exchange does not rely on whether this hash is keyed or not.

Game console 102 then generates a Kerberos authenticator. The Kerberos authenticator includes a timestamp (e.g., the current time of game console 102) and the HashInitMess digest. The timestamp is incremented by game console 102 every time device 102 generates a Kerberos authenticator, thereby allowing security gateway device 150 to better detect replay attacks. Game console 102 encrypts the Kerberos authenticator using the Kerberos session key $K_{CA}$, as follows:

$$Auth_T = E_{K_{CA}}[Time, HashInitMess].$$

Game console 102 then generates a key exchange initiator packet. The key exchange initiator packet includes the key exchange initiator message InitMess, the encrypted Kerberos authenticator $Auth_T$, and the Kerberos ticket for security gateway device 150 received from the key distribution center (e.g., center 128 of FIG. 1). As discussed above, the Kerberos ticket includes at least the Kerberos session key ($K_{CA}$), a range of time during which the ticket is valid, and a unique number that identifies game console 102, all encrypted using a secret key shared by the key distribution center and security gateway device 150. The SPI value identifies the security association or communication channel between game console 102 and security gateway device 150. The $SPI_1$ value is associated with communications from security gateway device 150 to game console 102, and an $SPI_2$ value is associated with communications from game console 102 to security gateway device 150. The key exchange initiator packet is thus as follows:

$$InitPacket = [InitMess, Auth_T, Ticket].$$

It should be noted that the combination of the authenticator and the ticket is referred to as the AP Request in Kerberos terminology. Game console 102 then sends the key exchange initiator packet to security gateway device 150.

Security gateway device 150 receives the key exchange initiator packet InitPacket. In one implementation, security gateway device 150 expects all key exchange initiator packets to be in a predetermined format and of a predetermined size. Any key exchange initiator packet not in this predetermined format or of the predetermined size is ignored by security gateway device 150. Alternatively, security gateway device 150 may allow key exchange initiator packets to be in a variety of formats and/or of a variety of sizes.

Once the key exchange initiator packet is received, security gateway device 150 decrypts the Kerberos ticket, using the key that security gateway device 150 shares with the key distribution center. Security gateway device 150 then checks the decrypted ticket to determine whether ticket is stale. If the current time is included in the range of times during which the ticket is valid (as identified in the ticket), then the ticket is not stale. However, if the current time is not included in the range of times during which the ticket is valid, then the ticket is stale. If the Kerberos ticket is stale, then the key exchange process fails, resulting in no security association being established between game console 102 and security gateway device 150. Security gateway device 150 may notify game console 102 that the key exchange process has failed, or alternatively security gateway device 150 may just delete the received InitPacket and not notify game console 102.

However, if the Kerberos ticket is not stale, then security gateway device 150 decrypts the Kerberos authenticator $Auth_T$ using the Kerberos session key $K_{CA}$ recovered from the decrypted Kerberos ticket. Security gateway device 150 then accesses the timestamp Time in the Kerberos authenticator and checks whether the timestamp is acceptable. The timestamp is acceptable if it is not too far out of synchronization with the current time on security gateway device 150. In an exemplary implementation, if the timestamp is within a threshold amount of time (e.g., 5 minutes, which is the recommended Kerberos time skew) from the current time on security gateway device 150, then the timestamp is acceptable. If the timestamp is not acceptable, then the key exchange process fails.

If the timestamp is acceptable, then security gateway device 150 computes the digest of the key exchange message InitMess. Security gateway device 150 computes the digest in the same manner as game console 102 computed the digest HashInitMess. Security gateway device 150 then checks whether the digest value it computed matches (is equal to) the digest value received from game console 102 as part of the encrypted Kerberos authenticator $Auth_T$. If the two digest values are the same then it serves to confirm that the key exchange message InitMess has not been altered between game console 102 and security gateway device 150 (e.g., the key exchange message InitMess has not been tampered with). If the two digest values do not match (in other words, if the two digest values are not equal), then the key exchange process fails.

However, if the received and computed digest values match, then security gateway device 150 checks whether the Kerberos authenticator has been replayed. Security gateway device 150 keeps a record of the timestamps from each Kerberos authenticator it receives from each game console C (which is revealed in the Kerberos ticket). If security gateway device 150 receives a Kerberos authenticator with a timestamp Time that is not newer than the last timestamp recorded by security gateway device 150, then security gateway device 150 knows that the Kerberos authenticator has been replayed. If the Kerberos authenticator has been replayed, then the key exchange initiator packet is not valid and the key exchange process fails. However, if the Kerberos authenticator has not been replayed, then the key exchange initiator packet has been validated by security gateway device 150. If all these tests are satisfied and the key exchange initiator packet is validated, then security gateway device 150 has authenticated game console 102 as really being the device it claims to be—security gateway device 150 has verified that game console 102 has knowledge of the Kerberos session key $K_{CA}$.

Initially, security gateway device 150 generates cryptographic keys based on the key exchange initiator message InitMess, the Kerberos session key $K_{CA}$, the nonce from game console 102 (NonceInit), and a nonce generated by security gateway device 150 (NonceResp). Security gateway device 150 generates a random (or pseudo-random) number Y, as well as a random value referred to as NonceResp. Security gateway device 150 further computes the Diffie-Hellman value ($g^{XY}$ mod N) as well as the Diffie-Hellman value ($g^Y$ mod N). At this point, security gateway device 150 has enough data to compute security association keys. The security association keys are used to secure point-to-point communication between two consoles. In an exemplary implementation, security gateway device 150 uses the two Diffie-Hellman values (($g^X$ mod N) and (Y)) to compute the function ($g^{XY}$ mod N). Security gateway device 150 can then compute various digests using various algorithms based on the values NonceInit, NonceResp, ($g^{XY}$ mod N), and the Kerberos session key $K_{CA}$. These digests are then used to form the security association keys. In one exemplary implementation, security gateway device 150 computes four different digests using NonceInit, NonceResp, and ($g^{XY}$ mod N) as input, as well as the Kerberos session key $K_{CA}$, to be used as the security association keys for authenticating and encrypting/decrypting all secure packets in both directions (one key for authentication, one key for encryption, times two for each direction totals four). Alternatively, the session key $K_{CA}$ itself may be used for authenticating and/or encrypting/decrypting secure packets in both directions.

Security gateway device 150 then generates a key exchange response message. The key exchange response message contains NonceInit, the timestamp Time received from game console 102, NonceResp, the Diffie-Hellman value ($g^Y$ mod N), and an $SPI_2$ value as follows:

RespMess=[NonceInit, $SPI_2$, NonceResp, ($g^Y$ mod N)].

The $SPI_2$ value is generated by security gateway device 150 and is associated with all communications from game console 102 to security gateway device 150. Security gateway device 150 then computes a digest of the response message using the Kerberos session key and a hash function H, as follows:

HashRespMess=$H_{K_{CA}}$[RespMess].

The hash function H used to generate HashRespMess may be the same as the hash function H used to generate HashInitMess (discussed above), or alternatively a different hash function.

Security gateway device 150 then generates a Kerberos reply message including both the computed hash digest and the timestamp Time from the Kerberos authenticator, as follows:

ReplyMess=[HashRespMess,Time].

Security gateway device 150 then encrypts the Kerberos reply message ReplyMess using an encryption algorithm E (e.g., Triple DES) and the Kerberos session key $K_{CA}$ as follows:

EncryptedReplyMess=$E_{K_{CA}}$[ReplyMess].

The encryption algorithm E used to generate EncryptedReplyMess may be the same encryption algorithm as used to generate $Auth_T$ (discussed above), or alternatively a different encryption algorithm.

Security gateway device 150 then generates a key exchange response packet that includes the key exchange response message RespMess, and the encrypted Kerberos reply message EncryptedReplyMess, as follows:

RespPacket=[RespMess, EncryptedReplyMess].

Security gateway device 150 then sends the key exchange response packet RespPacket to game console 102.

Game console 102 receives the key exchange response packet RespPacket from security gateway device 150. Game console 102 decrypts the Kerberos reply message EncryptedReplyMess using the Kerberos session key $K_{CA}$. Game console 102 then checks whether the timestamp Time in the decrypted reply message matches the timestamp Time that game console 102 sent to security gateway device 150. If the timestamps match (in other words, if the timestamps are equal), then the matching confirms that security gateway device 150 was able to decrypt the Kerberos ticket and the Kerberos authenticator (and thus has knowledge of the Kerberos session key $K_{CA}$), and therefore really is the security gateway device 150 that it claims to be. Security gateway device 150 is thus authenticated to game console 102 if these timestamp values match.

If the timestamp values do not match, then the key exchange process fails, resulting in no security association being established between game console 102 and security gateway device 150 (analogous to the discussion above, game console 102 may or may not notify security gateway device 150 that the key exchange process has failed). However, if the timestamp values do match, then security gateway device 150 is authenticated to game console 102 and game console 102 proceeds to compute the digest of the key exchange response message RespMess using the Kerberos session key $K_{CA}$. Game console 102 computes the digest in the same manner as security gateway device 150 computed HashRespMess (discussed above). Game console 102 then checks whether the digest value it computed matches (is equal to) the digest value received from security gateway device 150 as part of the encrypted Kerberos reply message EncryptedReplyMess. If the two digest values are the same then it serves to confirm that the key exchange response message RespMess has not been altered between security gateway device 150 and game console 102 (e.g., the key exchange response message RespMess has not been tampered with). If the two digest values do not match (in other words, if the two digest values are not equal), then the key exchange process fails.

However, if the two digest values do match, then game console 102 generates the cryptographic keys based on the Kerberos session key $K_{CA}$, NonceInit, NonceResp, and $g^{XY}$ mod N. Analogous to the discussion above regarding security gateway device 150 generating cryptographic keys, game console 102 now has enough data to calculate the Diffie-Hellman value ($g^{XY}$ mod N), and to compute the security association keys. The security association keys computed by game console 102 are the same as, and are calculated in the same manner as, those generated by security gateway device 150. Note that $g^{XY}$ mod N is computed from $g^Y$ mod N and X on the game console. Also note that, analogous to the discussion above, the session key $K_{CA}$ itself may alternatively be used for authenticating and/or encrypting/decrypting secure packets in both directions.

Once game console 102 has the security association keys, device 102 is free to transmit any packets that have been waiting for key exchange to complete. Security gateway device 150, however, is not free to do so even though it has the same set of keys because it cannot be sure that its response message RespMess was not lost. Security gateway device 150 waits until it receives a packet authenticated with the computed security association key from game console 102, or optionally until it receives an Acknowledge packet (Ack-Pack) from game console 102.

In the common case, game console 102 sends a packet to security gateway device 150 and thus, the key exchange process consists of just two packets—InitPacket and RespPacket. Alternatively, should game console 102 not have a packet to send, game console 102 will send an artificial acknowledge packet (denoted as "AckPack"). This packet differs from the two other key exchange packets in that the AckPack is hashed using the computed security association key instead of the Kerberos session key $K_{CA}$.

From this point forward, game console 102 and security gateway device 150 use the security association keys to secure communications. All network packets that need to be transmitted to the other are authenticated after optionally being encrypted, with the receiving device verifying the authentication data before decrypting the packet contents. Either of console 102 and device 150 can disregard key-exchange packets from the other side containing the same Nonces.

Security gateway device 150 maintains a record 172 of the security association information for game console 102 (act 206). This record includes the security keys (the security association key(s) and/or the session security key $K_{CA}$) to be used in encrypting data packets sent to game console 102 and decrypt data packets received from game console 102, the service mapping identifying which service devices in data center 110 that game console 102 is permitted to access, a fully qualified game console address (also referred to as an XNADDR), and Security Parameters Index (SPI) values.

As part of the mutual authentication of act 204, game console 102 generates an SPI value, referred to as $SPI_1$ that it includes in the key exchange packet that it sends to the security gateway device 150. Similarly, security gateway device 150 generates a value $SPI_2$ that it includes in the key exchange response packet sent to game console 102. The $SPI_1$ value allows game console 102 to identify the secure communications channel between game console 102 and security gateway device 150 as the particular channel to which the data packets sent by gateway device 150 correspond. All secure channel packets (after the key exchange) from the gateway device 150 to the game console 102 will contain the $SPI_1$ value to identify the channel. Similarly the $SPI_2$ value allows security gateway device 150 to identify the secure communications channel between game console 102 and security gateway device 150 as the particular channel to which the data packets sent by security game console 102 correspond. All secure channel packets (after the key exchange) from the game console 102 to the gateway device 150 will contain the $SPI_2$ value to identify the channel. Each secure communications channel, even though between the same game console 102 and security gateway device 150, typically has two different SPI values (one in each direction).

In one implementation, all packets to and from security gateway device 150 always contain an SPI value at the very beginning of the packet to specify which security channel the packet is for (so that the security gateway device 150 or game console 102 can use this value to lookup the corresponding key to decrypt the packet). For key exchange initiator and response packets, this leading SPI is set to a value of zero to indicate that this is a key exchange packet that does not have a corresponding SPI number established yet. However, included within the key exchange packet itself is the new proposed SPI value (which is non-zero) to use after the key exchange is complete. So key exchange packets actually contain two SPI values, the outer one (which is zero), and the inner one (which is non-zero).

The fully qualified address for game console 102 includes: the Ethernet MAC address for game console 102; the local IP address of the game console 102 (this is the IP address that the game console 102 believes it has, and may be different than the IP address from which security gateway device 150 receives data packets from game console 102 (e.g., due to a NAT device, such as a router, situated between game console 102 and security gateway device 150)); the IP address and port from which security gateway device 150 receives data packets from game console 102 (this may be the same as the local IP address of the game console 102, or alternatively different (e.g., the address of a NAT device)); a logical security gateway device number (an identifier assigned to the security gateway device to uniquely identify the security gateway device within the security gateway cluster); an SPI value (e.g., $SPI_1$ and/or $SPI_2$); and a game console id (the game console identity C discussed above). The contents of the fully qualified address can be determined based on the security ticket received from game console 102 as well as on the information embedded in data packets received from game console 102.

As part of the authentication in act 204, a unique data center visible IP address (an address used internally by the data center (on private network 108)) is assigned to the game console from a pool of addresses available to the security gateway device. The unique data center visible IP address is used by the security gateway device 150 (e.g., NAT traversal module 160) when forwarding packets across the public/private network boundary. Packets are received from network 106 of FIG. 1 and are forwarded inside the private network with the source IP address listed as this data center visible IP address. When a server in the data center replies to this traffic, the reply is routed back to the security gateway device that is assigned the address range that includes the target IP address of the reply. The security gateway device reverses the NAT process by looking up the security association for the game console that was assigned the target IP address, and forwards the reply back to the designated game console, with the reply's source address altered to be the internet address of the security gateway.

Security gateway device 150 maintains the security association information for game console 102 until the game console is no longer available (whether the game console 102 voluntarily logs out of data center 110 or becomes otherwise unavailable), at which point security gateway device 150 deletes the security association information for game console 102 (act 208). Security gateway device 150 uses this maintained security association information in communicating with game console 102, as discussed in more detail below. The security association information, including the session security key and/or security association key(s), is thus maintained only for each session—each time game console 102 logs in to the data center a new security association is generated.

Additionally, as part of the mutual authentication of act 204, various session parameters may be negotiated by game console 102 and security gateway device 150. These session parameters describe, in part, how communications between console 102 and device 150 should occur. Examples of such parameters include an interval at which heartbeat packets should be sent, data encryption algorithm(s) and/or encryption strength to be used, whether data packets are to be entirely or only partially encrypted, a quality of service to be provided to game console 102, and so forth. Each such session parameter may be set by game console 102 and optionally overridden by security gateway device 150, or alternatively set by security gateway device 150 and optionally overridden by game console 102.

Process 200 of FIG. 3 discusses use of a security ticket, such as a Kerberos ticket, to establish a mutually authenticated secure communication channel between the game console and the security gateway device. Alternatively, other processes may be used to establish the secure communication channel. The purpose of the secure communication channel is to allow a particular game console and a particular security gateway device of the security gateway cluster to communicate with one another in a manner that prevents other devices from interpreting or modifying the data being communicated within the channel.

Returning to FIG. 2, particular services in data center 110 are targeted by game console 102 using particular IP ports of security gateway device 150. Security gateway device 150 advertises multiple IP ports to the game consoles, each port being associated (by security gateway device 150) with a particular service. Thus, for example, if the presence and notification service devices were advertised as port 1, a game title executing on game console 102 could send TCP/IP packets to IPA:1, where IPA represents the IP address of security gateway device 150.

Communications between game console 102 and security gateway device 150 are carried out as data packets in accordance with the User Datagram Protocol (UDP). A particular port(s) is allocated to online UDP data packets for game consoles 102 on the Internet, so all communications between game console 102 and security gateway device 150 use this particular UDP port. In one exemplary implementation, for Xbox™ video game systems, this particular UDP port is 3074. Any non-UDP packets, or any UDP packets that are not sent to port 3074, received by security gateway device 150 are simply ignored by security gateway device 150.

Any data to be sent from game console 102 to security gateway device 150 is embedded in a UDP packet by public network interface 174 of game console 102. This occurs even if the data to be sent from game console 102 is to be sent in accordance with some other protocol. For example, assume that a game title executing on game console 102 desires to open a TCP/IP connection to a service in data center 110. The game title opens a socket and is assigned (e.g., by Winsock), a port 1024. The game title generates one or more data packets and sends them via TCP/IP port 1024 to the appropriate port advertised by security gateway device 150 for the service device desired by the game title. The public network interface 174 intercepts the TCP/IP packet, encrypts it, and embeds it in a UDP packet identifying the Internet address of security gateway device 150 and port 3074, and sends the UDP packet to security gateway device 150. Upon receipt of the UDP packet 150, assuming the packet 150 is authenticated, the UDP packet is decrypted and the TCP/IP packet extracted therefrom. Security gateway device 150 identifies the appropriate service device based on the security gateway device advertised port in the TCP/IP packet, and forwards the TCP/IP packet to the identified service device.

Figure 4A:
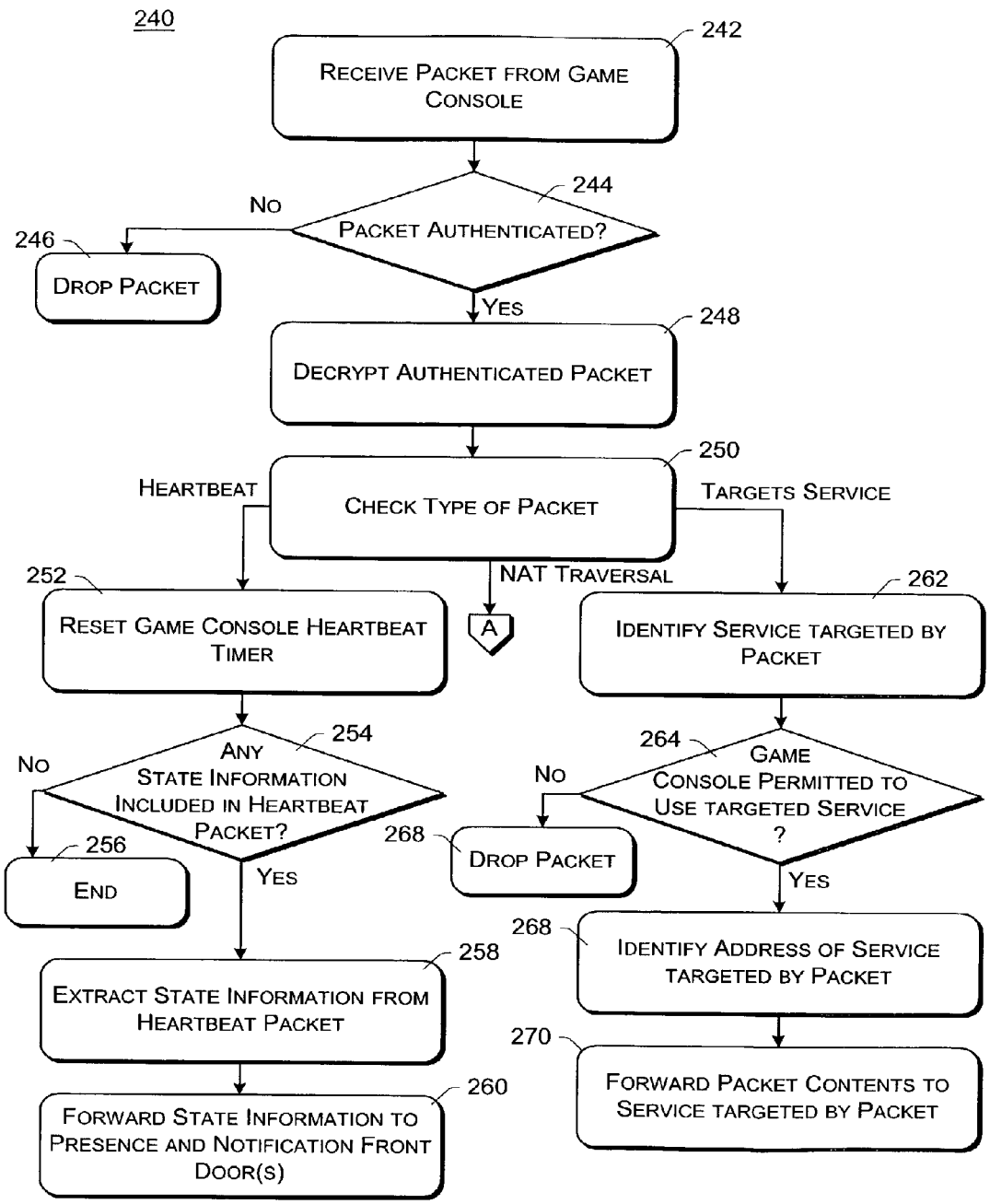
FIGS. 4a and 4b are a flowchart illustrating an exemplary process for managing data packets received from a game console.
Figure 4B:
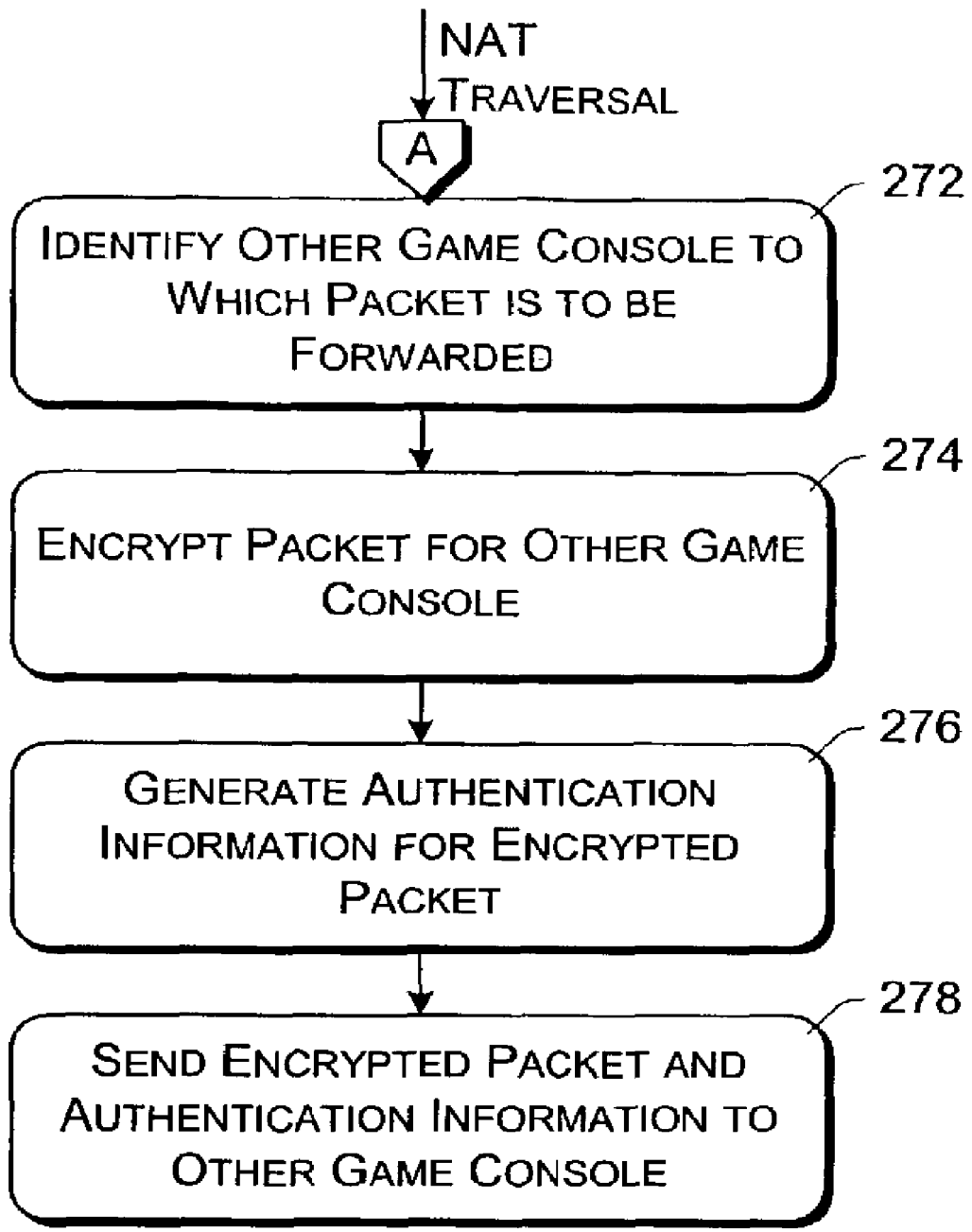

FIGS. 4a and 4b are a flowchart illustrating an exemplary process 240 for managing data packets received from a game console. The process of FIGS. 4a and 4b is implemented by a security gateway device (e.g., device 150 of FIG. 2) and may be performed in software, firmware, hardware, or combinations thereof. The process of FIGS. 4a and 4b is discussed with reference to components of FIGS. 1 and 2.

Initially, a packet is received from a game console (act 242). Packets sent to security gateway device 150 from game console 102 are encrypted by game console 102 and authentication information is generated by game console 102 for the encrypted packet based on the session key. Alternatively, this order could be reversed, with the authentication information being generated first and then the packet being encrypted. However, by generating the authentication information for the encrypted packet, security gateway device 150 is alleviated of the burden of decrypting the packet in order to authenticate the packet. In one exemplary implementation, the encryption algorithm is triple DES (Data Encryption Standard). Alternatively, other public and/or proprietary encryption algorithms may be used. Additionally, authentication information can be generated for a packet in a variety of different manners. In one exemplary implementation, the authentication information is generated by running a cryptographic hash algorithm (such as HMAC-SHA-1 (Hashed Message Authentication Code-Secure Hash Algorithm 1)) on the encrypted packet based on the session key.

Upon receipt of the packet, public network interface 152 makes the packet available to packet authentication module 156. Packet authentication module 156 authenticates the packet by running the same cryptographic hash algorithm as was used by game console 102, and checking whether the resultant value calculated by module 156 is the same as that received as the authentication information. If the values are the same then the packet is authenticated, whereas if the values are different then the packet is not authenticated.

If the packet is not authenticated then it is dropped (act 246). Security gateway device 150 simply ignores the dropped packet. However, if the packet is authenticated, then the packet is made available to packet decryption module 154 to decrypt the packet (act 248). This decryption is performed using a decryption algorithm corresponding to the encryption algorithm used by game console 102 in encrypting the packet.

Once decrypted, packet routing module 178 checks the type of the packet (act 250). In one exemplary implementation, three different types of packets may be received by security gateway device 150, each of which is handled differently. These three types are: a heartbeat packet (a heartbeat received from the game console), a NAT traversal packet (a packet received from a game console that targets another game console), and a service-targeting packet (a packet received from a game console that targets a service in the data center). The type of the packet can be identified in a header of the UDP packet or the body of the UDP packet (e.g., separate from or as part of (e.g., a header of) an embedded TCP/IP packet).

Heartbeat packets are received from game console 102 in order to keep the secure communication channel between game console 102 and security gateway device 150 open. In situations where an intermediary device, such as a router on a home network, is situated between game console 102 and security gateway device 150, the intermediary device need not have, and typically will not have, any knowledge of the types of data packets being communicated between game console 102 and security gateway device 150. All the intermediary device will see is that they are UDP packets. However, such an intermediary device is typically configured to maintain routing information (e.g., including the routing information between game console 102 and security gateway device 150), for only a certain period of time (e.g., typically in the range of thirty seconds to five minutes, although other periods may be used). If the intermediary device does not see any packets between these two devices within that period of time, the intermediary device deletes its routing information and establishes new routing information upon receipt of the next packet between the devices. Given the nature of the secure communication channel, this new routing information may be (and typically is) different than the previously used routing information, so a new session key would need to be generated by the game console 102 and the security gateway device 150.

In order to resolve this problem, game console 102 sends heartbeat signals at various intervals (e.g., twenty seconds since the last time it sent a packet to security gateway device 150, or every twenty seconds regardless of when the last packet was sent to security gateway device 150). The interval of time can vary, but should be configured to be less than the period of time typically used by intermediary devices in determining when to delete their routing information. In an exemplary implementation, these heartbeat signals are a particular type of UDP packet communicated to security gateway device 150. In another exemplary implementation, these heartbeat signals are a particular type of TCP/IP packet (e.g., distinguished from different types of packets by type information included in the header or body of the TCP/IP packet) embedded in a UDP packet prior to being communicated to security gateway device 150. The heartbeat signals further serve as an indication to game console availability module 176 that the game console identified by the packet is still available (also referred to as still being alive). If a threshold amount of time (e.g., three or four times the interval at which heartbeat signals are to be sent by the game console) elapses without receiving a heartbeat signal from a particular game console, then game console availability module 176 assumes that the game console is no longer available and communicates a message indicating the game console is no longer available to monitoring server(s) 112 of FIG. 1.

Given that heartbeat signals are at least somewhat-regularly communicated from game console 102 to security gateway device 150, additional status information can be embedded in the these heartbeat packets that include the heartbeat signals. For example, certain types of game status information (e.g., whether the user is playing or has paused the game, the user's current score, how much health or time the user has left remaining, etc.) are communicated from the game title to the public network interface 174 of game console 102. Interface 174 waits until the next time it is sending a heartbeat signal to security gateway device 150 and embeds this status information in the heartbeat packet, thereby alleviating the need for a separate data packet to be sent for the status information.

If the packet is a heartbeat packet, then game console availability module 176 resets the heartbeat timer for that game console to indicate that zero time has passed since the last heartbeat signal from that game console (act 252). Additionally, packet routing module 178 checks whether there is any state information included in the heartbeat packet (act 254). If there is no state information in the packet, then the process ends for this packet (act 256). However, if there is state information, then packet routing module 178 extracts the state information from the heartbeat packet (act 258) and forwards the state information to the presence and notification front door (act 260).

The security gateway device 150 is assigned a particular range of data center IP addresses to identify device 150 on the network (e.g., network 108 of FIG. 1) in the data center. Each of the front doors 114, 120, and 124, as well as each monitoring server(s) 112, is also assigned a particular data center IP address and port to identify the front doors, and monitoring server(s), in the data center (on network 108). Additionally, one or more of front doors 114, 120, and 124, and monitoring server(s) 112 may optionally be assigned multiple data center IP addresses and/or ports.

When security gateway device 150 needs to send a packet to a server or front door via private network 108, secure zone interface 170 includes data in the message header that identifies the message as being from the unique data center visible IP address assigned to the game console 102 from which the packet is received, as well as a particular port. The port identified by secure zone interface 170 is the same port used by the game title executing on game console 102 in sending the packet to security gateway device 170 (e.g., if the game title was assigned TCP/IP port 1024, then port 1024 is the port used by secure zone interface 170). It should be noted that this is the TCP/IP port identified by the game title executing on game console 102, not one of the service ports advertised on the Internet by security gateway device 150. If no port was used by the game title in sending the packet, then secure zone interface 170 selects a port to use (e.g., randomly, according to some predetermined criteria or ordering, etc.). Security gateway device 150 includes, as the destination for the packet, the data center IP address and port for the targeted service device (in act 260, this is the data center IP address and port for presence and notification front door(s) 114). It should be noted that the data packets sent via private network 108 need not be encrypted as it is within the secure zone of the data center.

Given the manner in which data packets are communicated from security gateway device 150 to the service devices of data center 110, upon receipt of a data packet the receiving device may know little, if anything, about the game console which originally sent the packet (because the service device sees the packet as coming from security gateway device 150, not from a particular game console). Thus, the security gateway device 150 allows the service devices to query device 150 for information about a particular game console. The service devices may communicate with security gateway device 150 directly (via network 108), or alternatively via the front door corresponding to the service device. For example, a particular port (e.g., port 0) for security gateway device 150 on network 108 may be reserved for the service devices to send packets to device 150 querying for this information. The service device includes, in its request, the data center IP address and port that it is requesting information for. The device 150 maintains a mapping of which data center IP address and port combinations are assigned to which game consoles (e.g., record 172 of FIG. 2), and the device 150 responds to the query by looking up all the information it has about the corresponding game console (e.g., its fully qualified address) and returning that information to the requesting service device. This allows, for example, a service device to verify the identity of a particular user and/or game console (e.g., to ensure that a request to delete a user's score actually came from that user).

Returning to act 250 of FIG. 4a, if the type of packet is a service-targeting packet, then packet routing module 178 identifies the service targeted by the packet (act 262). This identification is made by checking which advertised port of security gateway device 150 the packet was sent to by game console 102. Packet routing module 178 then checks whether the requesting game console is permitted to access the targeted service (act 264). This check is made by comparing the targeted service to the permission mapping (in record 172) to see whether the targeted service is identified as a permitted service for the game console. If the game console is not permitted to use the targeted service, then the packet is dropped (act 266) and simply ignored by security gateway device 150.

However, if the game console is permitted to use the device, then secure zone interface 170 identifies the data center IP address and port of the service targeted by the packet (act 268) and sends a message including the data contents of the packet to the targeted service (act 270).

Returning to act 250, if the type of packet is a NAT traversal packet, then NAT traversal module 160 identifies, based on the content of the decrypted packet, which other game console the packet is to be forwarded to (act 272 of FIG. 4b). A NAT traversal packet can be sent by a game console when it is attempting to establish a direct communication with another game console via one or more NAT devices (e.g., routers on one or more home networks). The NAT traversal packet allows the security gateway 104 to facilitate establishing this direct communication between game consoles.

The packet is then transferred to packet encryption module 164, which encrypts the packet for the other game console by using the session key for the other game console (act 274). Analogous to the discussion above regarding the game console encrypting data packets, packet encryption module 164 can encrypt data packets using any of a variety of encryption algorithms. The encrypted packet is then made available to authentication information generation module 162 which generates authentication information for the packet based on the session key for the other game console (act 276). Analogous to the discussion above regarding the game console generating authentication information, this authentication information can be generated in a variety of different manners. The encrypted packet, as well as the authentication information, is then sent by public network interface 152 to the other game console (act 278).

It should be noted that situations can arise, with respect to acts 272-278, where the security gateway cluster includes multiple security gateway devices and different security gateway devices within the cluster are responsible for handling the two game consoles (the console that the packet is received from and the other console identified in act 272). In this situation, the security gateway device that receives the packet identifies the security gateway device that is responsible for handling the other game console and sends that security gateway device the decrypted packet. The other security gateway device is then responsible for sending the packet on to the other game console (performing acts 274-278).

Thus, it can be seen that the individual service devices within data center 110 of FIG. 1 can rely on security gateway 104 to verify the authenticity of, and provide decryption services for, packets received from game consoles via the public network 106. The individual service devices can communicate with the security gateway 104 and perform some verification of users and/or game consoles if the devices desire to, or they can simply rely on security gateway 104.

It can also be seen that, by communicating amongst the various service devices in data center 110 via private network 108, the various devices can be any of a wide variety of devices and need only understand the network protocol being used (e.g., TCP/IP) in order to communicate with one another. For example, different service devices may be running different operating systems, may be using widely different hardware architectures (e.g., based on different microprocessor architectures), etc.

Figure 5:
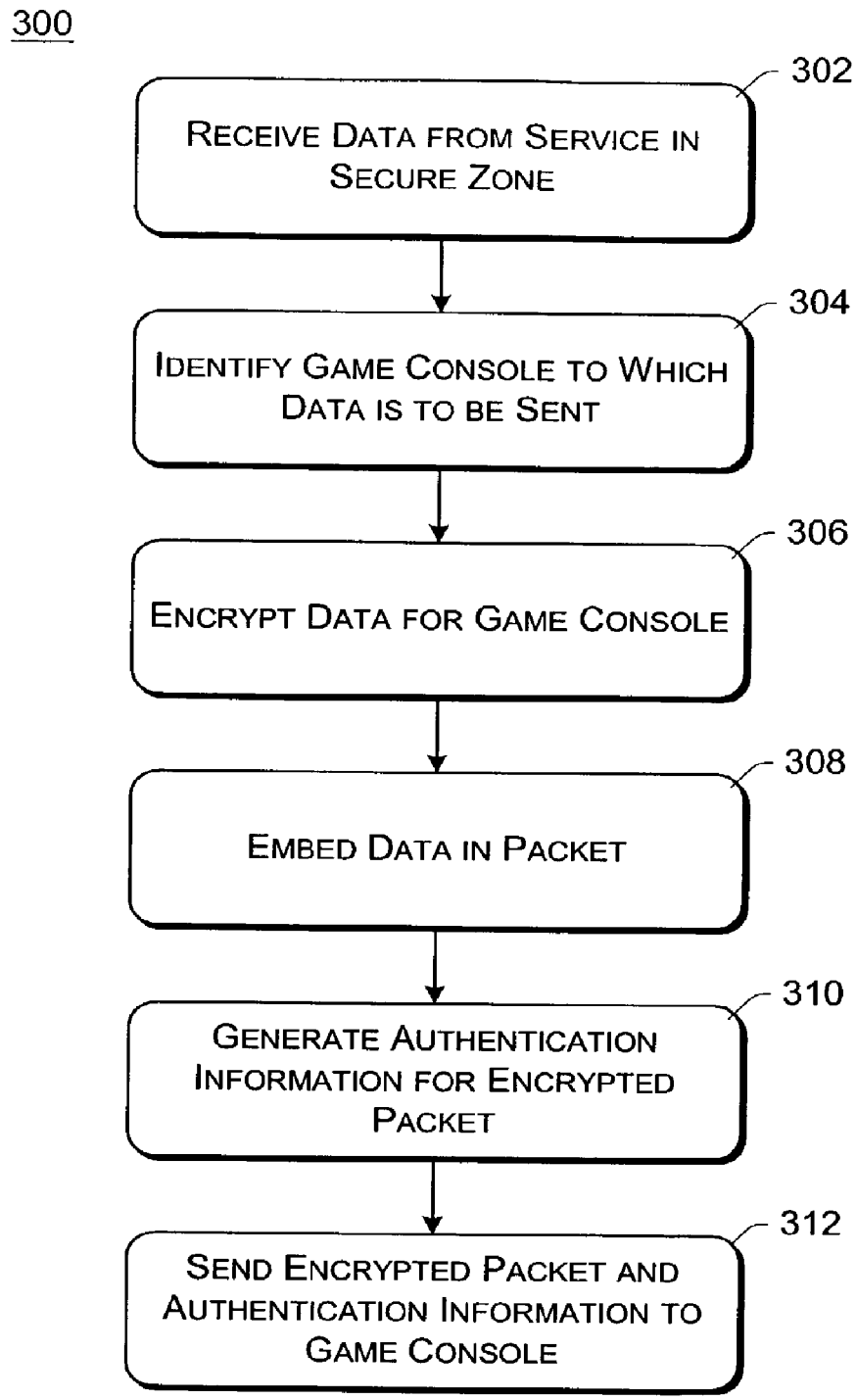
FIG. 5 is a flowchart illustrating an exemplary process for handling data packets to be sent to a game console.

FIG. 5 is a flowchart illustrating an exemplary process 300 for handling data packets to be sent to a game console. The process of FIG. 5 is implemented by a security gateway device (e.g., device 150 of FIG. 2) and may be performed in software, firmware, hardware, or combinations thereof. The process of FIG. 5 is discussed with reference to components of FIGS. 1 and 2.

Initially, data is received from a service in the secure zone of the data center (act 302). The service may desire to send data to a game console for any of a variety of reasons, such as in response to a request by the game console, in response to a request by another game console, of its own volition, etc. Regardless of the reason, the data is received by security gateway device 150 (as identified by the service in sending the message), and the game console to which the data is to be sent is identified (act 304). The manner in which security gateway device 150 identifies the game console can vary based on what identifying information the service provides to security gateway device 150. In one implementation, the game console can be identified by the information provided by the service (e.g., the service may send the fully qualified address of the game console). In another implementation, the service communicates only the data center IP address and port that it is aware of for the device (e.g., the data center visible IP address assigned by security gateway device 150 and the port used by security gateway device 150 in sending messages from this game console to services on network 108), in response to which the security gateway device looks up the fully qualified address of the corresponding game console (e.g., based on record 172).

The received data is then encrypted for the targeted game console (act 306) and embedded in a data packet (act 308). The security association key for the targeted game console is obtained from record 172 and used by packet encryption module 164 to encrypt the data for the packet. Analogous to the discussion above regarding the game console encrypting data packets, packet encryption module 164 can encrypt data packets using any of a variety of encryption algorithms. The encrypted packet is then made available to authentication information generation module 162 which generates authentication information for the packet based on the session key for the targeted game console (act 310). Analogous to the discussion above regarding the game console generating authentication information, this authentication information can be generated in a variety of different manners. The encrypted packet, as well as the authentication information, is then sent by public network interface 152 to the other game console (act 312).

Another function performed by security gateway device 150 is to send a heartbeat signal to game console 102, analogous to the heartbeat signal sent from game console 102 to security gateway device 150. This heartbeat signal helps to keep the routing information alive in any intermediary routing devices, and further serves to inform game console 102 that security gateway device 150 is still available.

Security gateway device 150 sends heartbeat signals at various intervals (e.g., twenty seconds since the last time it sent a packet to game console 102, or every twenty seconds regardless of when the last packet was sent to game console 102). The interval of time can vary, but should be configured to be less than the period of time typically used by intermediary devices in determining when to delete their routing information. If a sufficient amount of time (e.g., three or four times the interval at which heartbeat signals are to be sent by the security gateway device) elapses without receiving a heartbeat signal from a particular security gateway device, then the game console assumes that the security gateway device is no longer available and responds accordingly (e.g., attempts to establish a new secure communication channel with the security gateway cluster).

Figure 6:
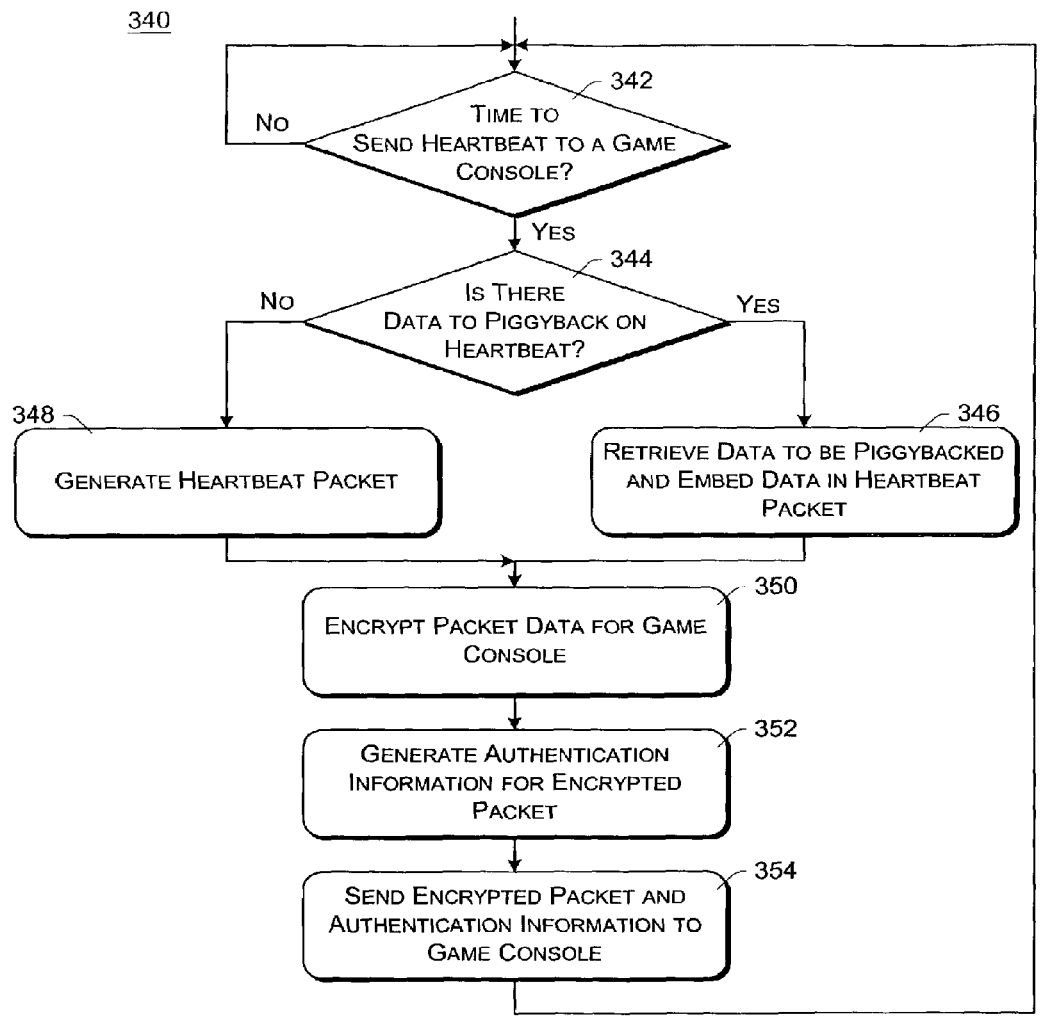
FIG. 6 is a flowchart illustrating an exemplary process for handling heartbeat packets to be sent to a game console

FIG. 6 is a flowchart illustrating an exemplary process 340 for handling heartbeat packets to be sent to a game console. The process of FIG. 6 is implemented by a security gateway device (e.g., device 150 of FIG. 2) and may be performed in software, firmware, hardware, or combinations thereof. The process of FIG. 6 is discussed with reference to components of FIGS. 1 and 2.

Heartbeat module 166 of security gateway device 150 waits until it is time to send a heartbeat packet to a game console (act 342). When it is time to send a heartbeat packet, heartbeat module 166 checks whether there is any data to be included in the heartbeat packet (piggybacked on the heartbeat signal) (act 344). Analogous to the discussion above regarding game consoles including other data in heartbeat packets sent to security gateway device 150, security gateway device 150 may also include other data in heartbeat packets sent to game console 102. In one exemplary implementation, only data from certain services (e.g., the presence and notification service) is included in heartbeat packets. In another exemplary implementation, a service indicates, when sending the data to security gateway device 150, whether the data can be included in a heartbeat signal.

In one implementation, a tickle module 168 is responsible for identifying particular game consoles that have data to be included in the next heartbeat signal being sent to those consoles. Heartbeat module 166 communicates with tickle module 168 to determine whether there is any data to piggyback on the heartbeat signal it is getting ready to send. If there is data to be included in the heartbeat packet, then a data packet is generated with the data embedded therein (act 346); otherwise, a data packet is generated without any such data (act 348). In one exemplary implementation, the data packets generated in act 346 and 348 are identified (e.g., with packet type information) as heartbeat packets, allowing the receiving game console to operate on them accordingly (e.g., checking for any additional data embedded therein).

Once the packet is generated in act 346 or 348, the data in the packet is encrypted by packet encryption module 164 for the targeted game console (act 350). This encryption process is analogous to act 308 of FIG. 5 discussed above. Authentication information for the encrypted packet is then generated (act 352), analogous to act 310 of FIG. 5, and the encrypted packet, as well as the authentication information, is sent to the game console (act 354), analogous to act 312 of FIG. 5. The process then returns to act 342, waiting until it is time to send another heartbeat signal.

It should be noted that multiple instances of process 340 may occur concurrently. For example, a heartbeat packet may be being generated in act 346 or 348 for one game console, while at the same time a packet for another game console is being encrypted in act 358, while at the same time a packet for yet another game console is being sent in act 354.

Returning to FIG. 2, it should be noted that the various modules and interfaces of security gateway device 150 may be implemented on, or utilize, the same or different hardware components. For example, public network interface 152 will typically be implemented using a network interface card (NIC) or hardware that couples device 150 to the public network, while secure zone interface 170 will typically be implemented using a different NIC or hardware that couples device 150 to the private network. Additionally, in one implementation packet decryption module 154 and packet encryption module 164, as well as optionally packet authentication module 156 and authentication information generation module 162, may be implemented using a special cryptographic processor(s) or co-processor(s). Such a cryptographic processor(s) or co-processor(s) is designed to perform cryptographic operations (such as encryption, decryption, and hashing) and alleviate other processor(s) (e.g., general purpose processors) in device 150 from the computationally-expensive cryptographic operations.

Figure 7:
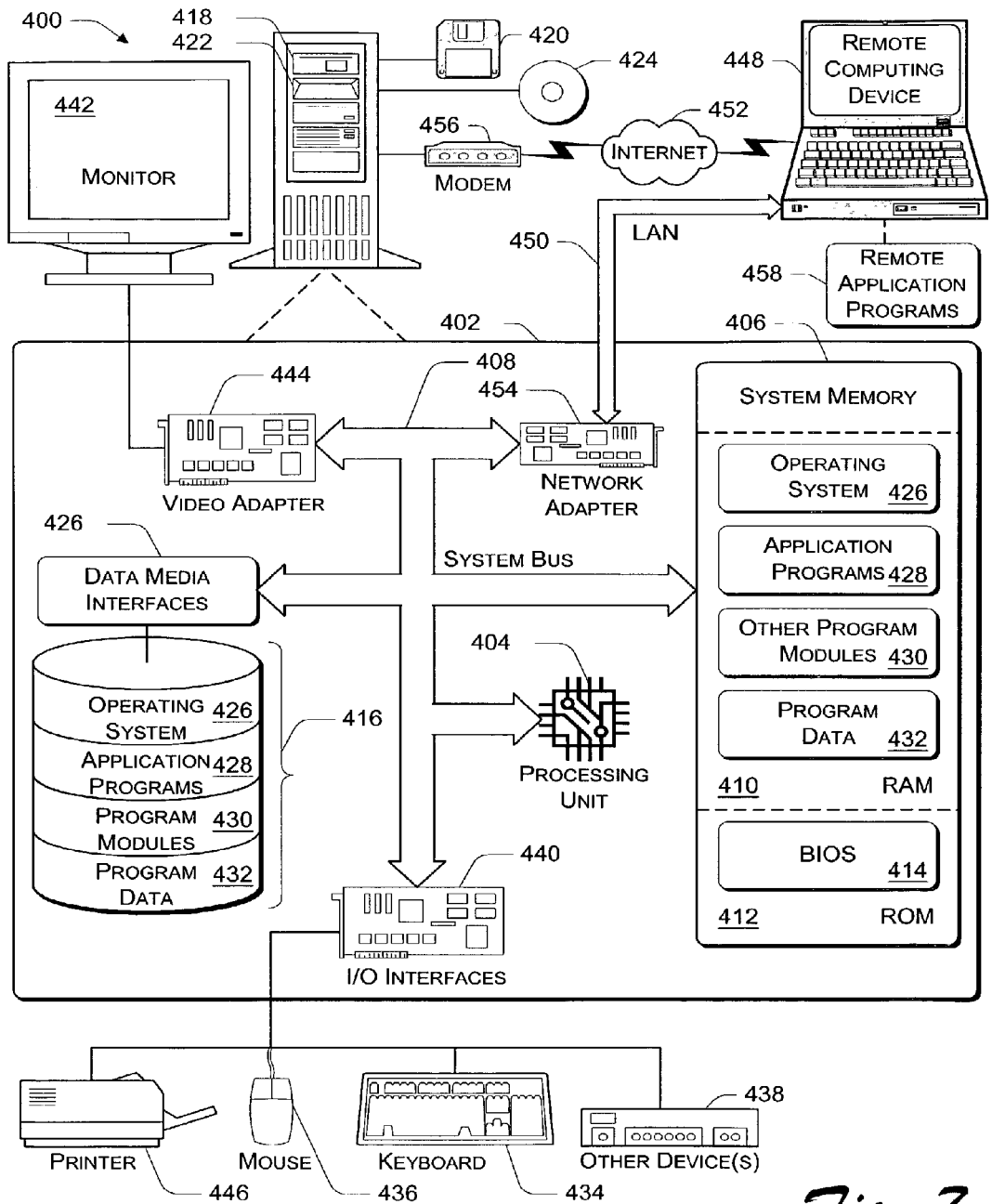
FIG. 7 illustrates a general computer environment, which can be used to implement the techniques described herein.

FIG. 7 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, a security gateway device 150 of FIG. 2, a server 112, 116, 118, 122, and/or 126 of FIG. 1, or a front door 114, 120, or 124 of FIG. 1. The components of computer 402 can include, but are not limited to, one or more processors or processing units 404 (optionally including a cryptographic processor or co-processor), a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 7 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, game console, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 8:
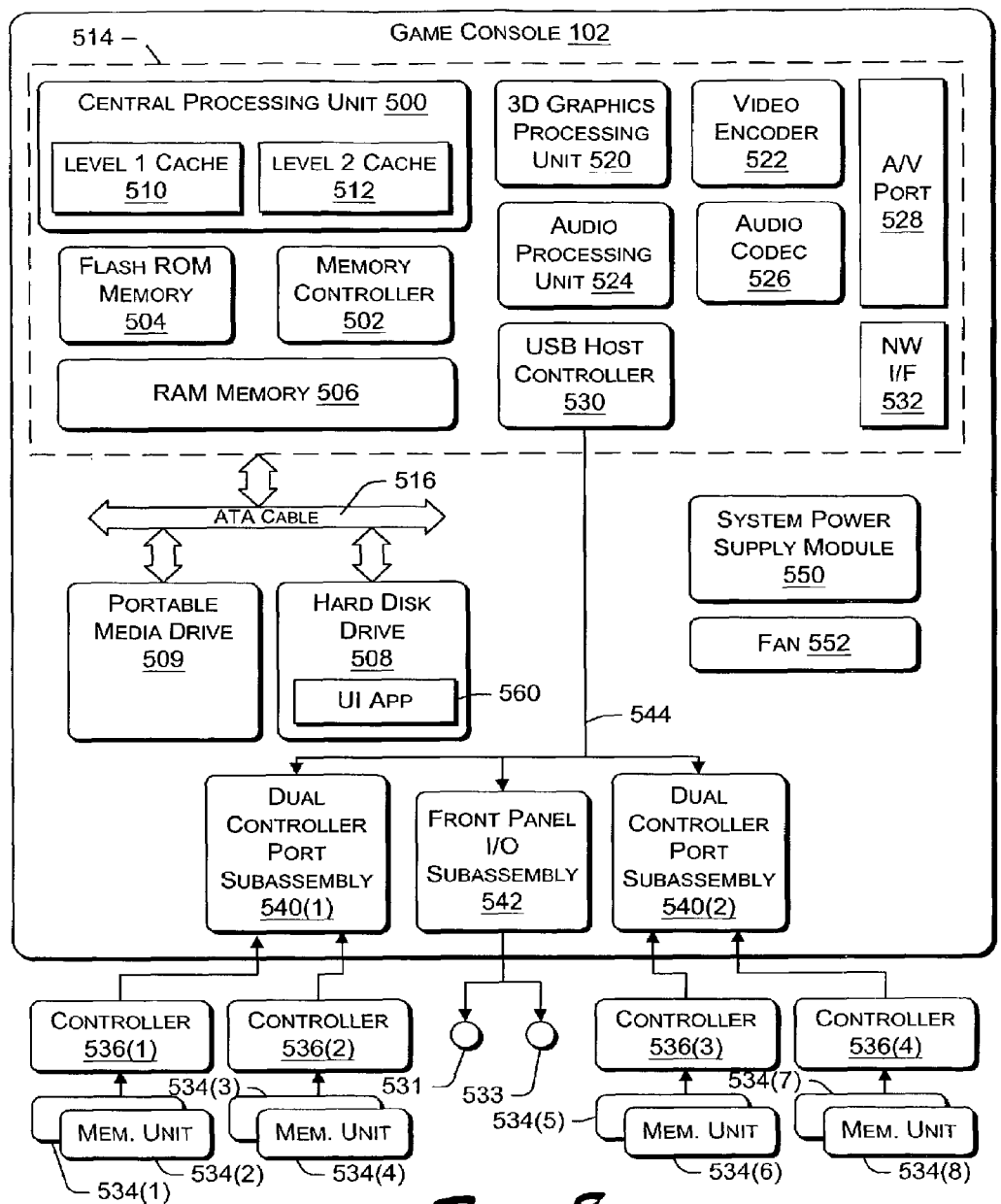
FIG. 8 shows functional components of a game console in more detail.

FIG. 8 shows functional components of a game console 102 in more detail. Game console 102 has a central processing unit (CPU) 500 and a memory controller 502 that facilitates processor access to various types of memory, including a flash ROM (Read Only Memory) 504, a RAM (Random Access Memory) 506, a hard disk drive 508, and a portable media drive 509. CPU 500 is equipped with a level 1 cache 510 and a level 2 cache 512 to temporarily store data and hence reduce the number of memory access cycles, thereby improving processing speed and throughput.

CPU 500, memory controller 502, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, CPU 500, memory controller 502, ROM 504, and RAM 506 are integrated onto a common module 514. In this implementation, ROM 504 is configured as a flash ROM that is connected to the memory controller 502 via a PCI (Peripheral Component Interconnect) bus and a ROM bus (neither of which are shown). RAM 506 is configured as multiple DDR SDRAM (Double Data Rate Synchronous Dynamic RAM) that are independently controlled by the memory controller 502 via separate buses (not shown). The hard disk drive 508 and portable media drive 509 are connected to the memory controller via the PCI bus and an ATA (AT Attachment) bus 516.

A 3D graphics processing unit 520 and a video encoder 522 form a video processing pipeline for high speed and high resolution graphics processing. Data is carried from the graphics processing unit 520 to the video encoder 522 via a digital video bus (not shown). An audio processing unit 524 and an audio codec (coder/decoder) 526 form a corresponding audio processing pipeline with high fidelity and stereo processing. Audio data is carried between the audio processing unit 524 and the audio codec 526 via a communication link (not shown). The video and audio processing pipelines output data to an A/V (audio/video) port 528 for transmission to the television or other display. In the illustrated implementation, the video and audio processing components 520-528 are mounted on the module 514.

Also implemented on the module 514 are a USB host controller 530 and a network interface 532. The USB host controller 530 is coupled to the CPU 500 and the memory controller 502 via a bus (e.g., PCI bus) and serves as host for the peripheral controllers 536(1)-536(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 540(1) and 540(2), with each subassembly supporting two game controllers 536(1)-536(4). A front panel I/O subassembly 542 supports the functionality of a power button 531 and a media drive eject button 533, as well as any LEDs (light emitting diodes) or other indicators exposed on the outer surface of the game console. The subassemblies 540(1), 540(2), and 542 are coupled to the module 514 via one or more cable assemblies 544.

Eight memory units 534(1)-534(8) are illustrated as being connectable to the four controllers 536(1)-536(4), i.e., two memory units for each controller. Each memory unit 534 offers additional storage on which games, game parameters, and other data may be stored. When inserted into a controller, the memory unit 534 can be accessed by the memory controller 502.

A system power supply module 550 provides power to the components of the game console 102. A fan 552 cools the circuitry within the game console 102.

A console user interface (UI) application 560 is stored on the hard disk drive 508. When the game console is powered on, various portions of the console application 560 are loaded into RAM 566 and/or caches 510, 512 and executed on the CPU 500. Console application 560 presents a graphical user interface that provides a consistent user experience when navigating to different media types available on the game console.

Game console 102 implements a cryptography engine to perform common cryptographic functions, such as encryption, decryption, authentication, digital signing, hashing, and the like. The cryptography engine may be implemented as part of the CPU 500, or in software stored on the hard disk drive 508 that executes on the CPU, so that the CPU is configured to perform the cryptographic functions. Alternatively, a cryptography processor or co-processor designed to perform the cryptographic functions may be included in game console 102.

Game console 102 may be operated as a standalone system by simply connecting the system to a television or other display. In this standalone mode, game console 102 allows one or more players to play games, watch movies, or listen to music. However, with the integration of broadband connectivity made available through the network interface 532, game console 102 may further be operated as a participant in online gaming, as discussed above.

It should be noted that although the game console discussed herein is described as a dedicated game console (not a general-purpose PC running computer games), the game console may also incorporate additional functionality. For example, the game console may include digital video recording functionality so that it can operate as a digital VCR, the game console may include channel tuning functionality so that it can tune and decode television signals (whether they be broadcast signals, cable signals, satellite signals, etc.), and so forth.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method of providing an online service between a private network and a game console, the method comprising:
communicatively coupling a security gateway between the game console and the private network for secure communications;
receiving, from the game console, a request to establish a secure communication channel with the security gateway in order to allow the game console to communicate with one or more servers within the private network configured to provide online services via the security gateway the request includes at least a key exchange initiation message, a Kerberos authenticator, and a Kerberos security ticket the authenticator is encrypted using a first key and the security ticket is encrypted using a second key, and the first key is different than the second key;
authenticating the game console using the security gateway based at least in part on the initiation message, the authenticator and the security ticket received from the game console;
transmitting from the security gateway a response to the request to establish a secure communication channel the response including at least a portion of the initiation message at least a portion of the response authenticating the security gateway to the game console;
establishing one or more security keys to be used by the security gateway and the game console to encrypt information to be sent to one another, the one of more security keys being based on at least portions of the security ticket and the initiation message;
maintaining within the security gateway the one or more security keys as being associated with the game console; and
generating a requested service in response to a request from the game console, wherein the generating of the requested service is abstracted from the authentication performed by the security gateway.

2. A method as recited in claim 1, further comprising:
receiving at the security gateway a service request from the game console;
decrypting the service request using the security gateway;
forwarding the service request from the security gateway to a corresponding server within the private network;
generating the requested service using the corresponding server in response to the service request from the game console;
transmitting the requested service from the corresponding server to the security gateway;
encrypting the requested service using the security gateway; and
transmitting the encrypted requested service to the game console using the security gateways wherein the generating of the requested service is abstracted from the authentication and encryption performed by the security gateway.

3. A method as recited in claim 1, wherein the request includes an authenticated indication of one or more of a plurality of services that the game console is permitted to access via the security gateway, and wherein the private network includes a plurality of servers, each server being configured to provide at least one of the plurality of services.

4. A method as recited in claim 1, further comprising maintaining, as being associated with the game console, a fully qualified address for the game console, wherein the fully qualified address for the game console comprises one or more of:
an Ethernet MAC address of the game console;
a local IP address of the game console;
an IP address and port from which data packets are received from the game console;
a device number of the security gateway;
a Security Parameters Index (SPI) of the secure communication channel; and
an identity of the game console.

5. A method as recited in claim 1, further comprising maintaining, as being associated with the game console, a fully qualified address for the game console, wherein the fully qualified address for the game console comprises:
an Ethernet MAC address of the game console;
a local IP address of the game console;
an IP address and port from which data packets are received from the game console;
a device number of the security gateway;
a Security Parameters Index (SPI) of the secure communication channel; and
an identity of the game console.

6. A method as recited in claim 1, further comprising negotiating, with the game console, one or more session parameters describing how communication between the game console and the security gateway should occur.

7. A method as recited in claim 1, wherein the one or more security keys are further to be used by the security gateway and the game console to authenticate information to be received from one another.

8. One or more computer readable media having stored thereon a plurality of instructions that, when executed by one or more processors, causes the one or more processors to:
receive, from a game console, a request to establish a secure communication channel with a security gateway in order to allow the game console to communicate with a private network that includes one or more servers configured to provide online services to the game console via the security gateway, the request includes at least a key exchange initiation message, a Kerberos authenticator, and a Kerberos security ticket, the authenticator is encrypted using a first key and the security ticket is encrypted using a second key, and the first key is different than the second key;
authenticate the game console using the security gateway based at least in part on the initiation message, the authenticator and the security ticket received from the game console;
transmit from the security gateway a response to the request to establish a secure communication channel, the response including at least a portion of the initiation message, at least a portion of the response authenticates authenticate the security gateway to the game console;
establish one or more security keys to be used by the security gateway and the game console to authenticate information to be sent to one another, the one of more security keys being based on at least portions of the security ticket and the initiation message; and
maintain within the security gateway the one or more security keys as being associated with the game console, wherein generating a requested service in response to a request from the game console is abstracted from the authentication performed by the security gateway.

9. One or more computer readable media having stored thereon a plurality of instructions that, when executed by one or more processors, causes the one or more processors to:
   establish, for each of a plurality of game consoles, a different security association corresponding to the game console, wherein each security association has one or more related security keys to be used to encrypt data to be communicated to and from the corresponding game console using a security gateway configured between the plurality of game consoles and a private network that includes one or more service devices configured to provide online services to the plurality of game consoles;
   maintain, for each of the plurality of game consoles, information related to the security association using the security gateway until the game console is no longer available, wherein the information related to the security association includes the one or more security keys; and
   use the maintained information related to the security association corresponding to the game console in communicating data, received from at least one of the service devices, to the game console using the security gateway wherein generation of a requested service by the private network in response to a request from at least one of the game consoles is abstracted from the establishment and maintenance of the security associations performed by the security gateway,
   wherein at least one security association is established based at least in part on:
   a request received from the game console, the request including at least a key exchange initiation message, a Kerberos authenticator, and a Kerberos security ticket, the authenticator is encrypted using a first key and the security ticket is encrypted using a second key, and the first key is different than the second key;
   authenticating the game console using the security gateway based at least in part on the initiation message, the authenticator and the security ticket received from the game console;
   transmitting from the security gateway a response to the request to establish a secure communication channel the response including at least a portion of the initiation message, at least a portion of the response authenticating the security gateway to the game console; and
   establishing one or more security keys to be used by the security gateway and the game console to encrypt information to be sent to one another, the one of more security keys being based on at least portions of the security ticket and the initiation message.

10. One or more computer readable media as recited in claim 9, wherein the information related to the security association corresponding to a particular game console includes an authenticated indication of one or more of a plurality of services that the particular game console is permitted to access.

11. One or more computer readable media as recited in claim 9, wherein the information related to the security association corresponding to a particular game console includes one or more of:
   an Ethernet MAC address of the particular game console;
   a local IP address of the particular game console;
   an IP address and port from which data packets are received from the particular game console;
   a Security Parameters Index (SPI) of the security association; and
   an identity of the particular game console.

12. One or more computer readable media as recited in claim 9, further comprising computer executable instructions that, when executed, cause the one or more processors to:
   receive at the security gateway a service request from the game console;
   decrypt the service request using the security gateway;
   forward the service request from the security gateway to a corresponding service device within the private network;
   generate the requested service using the corresponding service device in response to the service request from the game console;
   transmit the requested service from the corresponding service device to the security gateway;
   encrypt the requested service using the security gateway; and
   transmit the encrypted requested service to the game console using the security gateway, wherein the generation of the requested service is abstracted from the decryption and encryption performed by the security gateway.

13. One or more computer readable media as recited in claim 9, wherein the one or more processors are part of the security gateway.

14. One or more computer readable media as recited in claim 9, wherein the one or more security keys are further to be used to authenticate data to be communicated to and from the corresponding game console.

15. A method comprising:
   communicatively linking a security gateway between a plurality of game consoles and a private network that includes one or more service devices configured to provide online services;
   using the security gateway to establish, for each of the plurality of game consoles, a different security association corresponding to the game console, wherein each security association has one or more related security keys to be used to authenticate data to be communicated to and from the corresponding game console via the security gateway;
   using the security gateway to maintain, for each of the plurality of game consoles, information related to the security association until the game console is no longer available, wherein the information related to the security association includes the one or more security keys;
   using the maintained information related to the security association corresponding to the game console in communicating data, received from at least one of the service devices, to the game console via the security gateway; and
   generating a requested service using the private network in response to a request from at least one of the game consoles, wherein the generation of the requested service is abstracted from the establishment and maintenance of the security associations performed by the security gateway,
   wherein the step of using the security gateway to establish for each of the plurality of game consoles, a different security association corresponding to the game console further comprises:
   receiving a request from the game console, the request including at least a key exchange initiation message, a Kerberos authenticator, and a Kerberos security ticket, the authenticator is encrypted using a first key and the security ticket is encrypted using a second key, and the first key is different than the second key;

authenticating the game console using the security gateway based at least in part on the initiation message, the authenticator, and the security ticket received from the game console;

transmitting from the security gateway a response to the request to establish a secure communication channel, the response including at least a portion of the initiation message, at least a portion of the response authenticating the security gateway to the game console; and establishing one or more security keys to be used by the security gateway and the game console to encrypt information to be sent to one another, the one or more security keys being based on at least portions of the security ticket and the initiation message.

* * * * *